(12) United States Patent
Enomura et al.

(10) Patent No.: US 11,591,239 B2
(45) Date of Patent: Feb. 28, 2023

(54) SILICON DOPED METAL OXIDE PARTICLES, AND COMPOSITION FOR UV ABSORPTION COMPRISING SILICON DOPED METAL OXIDE PARTICLES

(71) Applicant: M. TECHNIQUE CO., LTD., Izumi (JP)

(72) Inventors: Masakazu Enomura, Izumi (JP); Daisuke Honda, Izumi (JP)

(73) Assignee: M. TECHNIQUE CO., LTD., Izumi (JP)

( * ) Notice: Subject to any disclaimer, the term of this patent is extended or adjusted under 35 U.S.C. 154(b) by 47 days.

(21) Appl. No.: 16/485,746

(22) PCT Filed: Feb. 14, 2017

(86) PCT No.: PCT/JP2017/005389
§ 371 (c)(1),
(2) Date: Aug. 13, 2019

(87) PCT Pub. No.: WO2018/150477
PCT Pub. Date: Aug. 23, 2018

(65) Prior Publication Data
US 2019/0367747 A1 Dec. 5, 2019

(51) Int. Cl.
*C09D 5/32* (2006.01)
*C09D 17/00* (2006.01)
(Continued)

(52) U.S. Cl.
CPC ............ *C01G 49/02* (2013.01); *C01F 17/235* (2020.01); *C01G 9/02* (2013.01); *C01G 49/0036* (2013.01);
(Continued)

(58) Field of Classification Search
CPC .......... C09D 5/32; C09D 17/007; C01G 9/02; C01G 49/0036; C01G 49/0072;
(Continued)

(56) References Cited

U.S. PATENT DOCUMENTS 5,766,279 A    6/1998   Ueda et al.
5,951,724 A *  9/1999   Hanawa ................... C09G 1/02
                                                51/309

(Continued)

FOREIGN PATENT DOCUMENTS

CN       102380366 A      3/2012
CN       109072010 A      12/2018
(Continued)

OTHER PUBLICATIONS

Ilkay Cesar,,‡ Kevin Sivula, Andreas Kay, Radek Zboril, and Michael Gratzel, Influence of Feature Size, Film Thickness, and Silicon Doping on the Performance of Nanostructured Hematite Photoanodes for Solar Water Splitting, J. Phys. Chem. C 2009, 113, 772-782. (Year: 2009).*

(Continued)

*Primary Examiner* — Bijan Ahvazi
(74) *Attorney, Agent, or Firm* — Birch, Stewart, Kolasch & Birch, LLP

(57) ABSTRACT

The object of the present invention is to provide silicon doped metal oxide particles for UV absorption, which average molar absorption coefficient in the wavelength range of 200 nm to 380 nm, is enhanced. Provided is silicon doped metal oxide particles in which the metal oxide particles are doped with silicon, wherein an average molar absorption coefficient in the wavelength range of 200 nm to 380 nm, of a dispersion in which the silicon doped metal oxide particles (Continued)

are dispersed in a dispersion medium, is improved as compared with similar metal oxide particles not doped with silicon.

5 Claims, 9 Drawing Sheets

(51) Int. Cl.
*C01G 9/02* (2006.01)
*C01G 49/00* (2006.01)
*C01G 49/02* (2006.01)
*C01F 17/00* (2020.01)
*C01F 17/235* (2020.01)

(52) U.S. Cl.
CPC ........... *C01G 49/0072* (2013.01); *C09D 5/32* (2013.01); *C09D 17/007* (2013.01); *C01P 2002/54* (2013.01); *C01P 2002/72* (2013.01); *C01P 2002/84* (2013.01); *C01P 2004/04* (2013.01); *C01P 2004/64* (2013.01); *C01P 2006/60* (2013.01)

(58) Field of Classification Search
CPC .. C01G 49/02; C01F 17/0043; C01P 2002/54; C01P 2002/84; C01P 2004/04; C01P 2004/64; C01P 2006/60
See application file for complete search history.

(56) References Cited

U.S. PATENT DOCUMENTS

| | | | |
|---|---|---|---|
| 2004/0241189 A1* | 12/2004 | Ishii | A61K 8/0212 424/200.1 |
| 2006/0194057 A1* | 8/2006 | Pfluecker | A61K 8/046 428/404 |
| 2010/0003202 A1* | 1/2010 | Matsumoto | C09C 3/10 424/59 |
| 2010/0008872 A1 | 1/2010 | Katusic et al. | |
| 2010/0297041 A1* | 11/2010 | Smith | A61Q 1/02 424/59 |
| 2015/0202655 A1 | 7/2015 | Nakano et al. | |
| 2015/0217332 A1 | 8/2015 | Fujii et al. | |
| 2017/0130358 A1 | 5/2017 | Enomura | |
| 2017/0218206 A1 | 8/2017 | Yamane et al. | |
| 2019/0135654 A1 | 5/2019 | Enomura et al. | |

FOREIGN PATENT DOCUMENTS

| | | |
|---|---|---|
| JP | 9-30933 A | 2/1997 |
| JP | H09-132770 A | 5/1997 |
| JP | H09-188517 A | 7/1997 |
| JP | H10-298537 A | 11/1998 |
| JP | 2007-031216 A | 2/2007 |
| JP | 2007-131460 A | 5/2007 |
| JP | 2009-112892 A | 5/2009 |
| JP | 2009-132596 A | 6/2009 |
| JP | 2009-263547 A | 11/2009 |
| JP | 2009-545509 A | 12/2009 |
| JP | 2011-245474 A | 12/2011 |
| JP | 2013-001578 A | 1/2013 |
| JP | 2013-170113 A | 9/2013 |
| JP | 2014-042891 A | 3/2014 |
| JP | 2014-042892 A | 3/2014 |
| JP | 2016-107427 A | 6/2016 |
| JP | 6077705 B1 | 2/2017 |
| WO | WO 2011/027115 A2 | 3/2011 |
| WO | WO 2016/010018 A1 | 1/2016 |

OTHER PUBLICATIONS

D. P. Howard, P. Marchand, C. J. Carmalt, I. P. Parkin and J. A. Darr, Si-doped zinc oxide transparent conducting oxides; nanoparticle optimisation, scale-up and thin film deposition, J. Mater. Chem. C, 2017, 5, 8796-8801. (Year: 2017).*
International Search Report for PCT/JP2017/005389 (PCT/ISA/210) dated Mar. 28, 2017, with English translation.
Extended European Search Report for European Application No. 17896964.8, dated Sep. 2, 2020.
Liang et al., "Photoelectrochemical Characterization of Sprayed $\alpha$-$Fe_2O_3$ Thin Films: Influence of Si Doping and $SnO_2$ Interfacial Layer", International Journal of Photoenergy, vol. 2008, Jan. 1, 2008, pp. 1-7.
Ma et al., "Si/$NiCo_2O_4$ heterostructures electrodes with enhanced performance for supercapacitor", RSC Advances, vol. 5, No. 77, Jan. 1, 2015, pp. 62813-62818.
Sorar et al., "Optical and structural properties of Si-doped ZnO thin films", Applied Surface Science, Elsevier, vol. 257, No. 16, Mar. 29, 2011, pp. 7343-7349.
Korean Office Action for Korean Application No. 10-2019-7026102, dated Oct. 6, 2021, with English translation.
Chinese Office Action and Search Report for Chinese Application No. 201780086499.4, dated Nov. 26, 2021, with an English translation.

* cited by examiner (Linear analysis)

(a) HAADF (b) Si (c) Fe (d) O (Linear analysis)

SILICON DOPED METAL OXIDE PARTICLES, AND COMPOSITION FOR UV ABSORPTION COMPRISING SILICON DOPED METAL OXIDE PARTICLES

TECHNICAL FIELD

The present invention relates to silicon doped metal oxide particles and a composition for ultraviolet absorption comprising silicon doped metal oxide particles.

BACKGROUND ART

Oxide particles change characteristics such as ultraviolet absorption characteristics by selecting a type of metal elements or metalloid elements contained in the oxide particles. Accordingly, the oxide particles are a material used in a wide range of fields such as paints and films, or sunscreens and lipsticks and foundations in the cosmetic field, which are used for outer walls of building materials, signboards, vehicles or glasses by utilizing the oxide particles' characteristics. In recent years, when used for paints, etc. used in exterior walls of building materials, signboards, vehicles and the like, demands for the above ultraviolet absorbability as well as vividness of colors and excellent designability are increasing. When used for application to human bodies as in cosmetics and the like, demands for the above ultraviolet absorption ability as well as aesthetics, textures, and safeties are also increasing.

In general, regarding the ultraviolet absorption ability, a large amount of ultraviolet lights can be absorbed in a smaller amount, as absorption per unit mass in the wavelength range of 200 nm to 380 nm is higher, that is, as the "molar absorption coefficient" is larger. Therefore, when the molar absorption coefficient is large, the ultraviolet absorption ability similar to or greater than that of the original state can be exhibited in a small amount, so that a haze value can be decreased and transparency of a coating film or a film can be enhanced.

Therefore, the following methods or products have been developed. One of them is a method of micronizing oxides such as iron oxide and zinc oxide (see Patent Literature 1 and Patent Literature 2). As a method of improving an ultraviolet absorption ability of ultraviolet absorption materials, disclosed are zinc oxide particles containing silicon (Si) in the zinc oxide particles produced by performing the step of mixing a solution dissolving an alkali metal hydroxide in an alcohol and a zinc salt solution in the presence of a compound having Si to obtain the zinc oxide particles (Patent Literature 3); an oxide containing iron in zinc oxide (by doping) (Patent Literature 4); a method of shifting the ultraviolet absorption region to the long wavelength side by doping a metal oxide with a component derived from cobalt (Co), copper (Cu), iron (Fe), bismuth (Bi) or the like (Patent Literature 5).

However, although transparency of a microparticle dispersion can be improved by micronization as proposed in Patent Literature 1, the ultraviolet absorption ability is low, and complete absorption or block of the ultraviolet light of 380 nm or less is difficult. Therefore, a large amount of ultramicroparticles must be used per unit area, and the film thickness becomes too thick, and the amount used becomes large, and thereby a problem of lacking practicality exists other than the problem of the transparency etc. Moreover, the zinc oxide described in Patent Literature 2 aims at expressing high whiteness, and the described specific surface area of 10 $m^2/g$ to 30 $m^2/g$ can be converted to the particle diameter of 100 nm to 300 nm as spheric particles. Since the particles are coarsened by the described heat treatment at 400° C. or higher, it is difficult to realize high transparency, though the white concealing property is ensured. Furthermore, the zinc oxide particles containing silicon (Si) in the zinc oxide particles described in Patent Literature 3 are produced by a general batch method, and a precipitation speed of a compound having zinc oxide and Si which differs depending on concentration, pH, etc. is not controlled, so that it is assumed that it is difficult to incorporate Si into the inside of zinc oxide particles. Although it is recognized according to Table 2 and FIG. 1 of Patent Literature 3 that the absorption edge in the ultraviolet region of the wavelength 380 nm or less is shifted to the short wavelength side when the ratio of $SiO_2$ contained in the zinc oxide is higher, at the same time the transmittance in the same ultraviolet region is increased and the molar absorption coefficient has not been improved. Further, Patent Literature 4 discloses that the desired iron containing ultramicroparticle zinc oxide can be obtained by performing the heat treatment at 300° C. to 600° C., however, coarsening of the particles is confirmed at the heat treatment at 300° C. to 600° C., and improvement of the molar absorption coefficient is difficult. Further, the transmittance in the visible light region disclosed in Patent Literature 5 is low, and the ultraviolet absorption ability is evaluated as having a transmittance of 30% or less in a wavelength range of 400 nm, but the ultraviolet absorption ability in UV-A, B and C has not be evaluated, therefore, its practical use is difficult.

Further, Patent Literature 6 filed by the present applicant discloses a method of producing single crystal zinc oxide particles, and Patent Literature 7 filed by the present applicant discloses a method of producing precipitates in which the doping element is controlled. By using a forced thin film type microreactor in which materials are mixed between two processing surfaces being capable of approaching to and separating from each other and rotating relative to each other, a raw material solution and a precipitation solvent can be instantaneously mixed, diffused, and reacted. Since the nanoparticles precipitated by the reaction in the forced thin film can give the desired energy uniformly at the molecular level, there is an effect of easily obtaining single crystal particles or particles with a controlled amount of the doping element. However, sufficient investigations for controlling the molar absorption coefficient have not been made with regard to oxide particles doped with a metal element and complex oxides, and control factors have not been clarified. Moreover, the above technical problems cannot be solved only by the contents disclosed regarding doping oxide particles with silicon.

Furthermore, the ultraviolet absorption ability of the oxide which is actually required to use as a composition for ultraviolet absorption, should be originally evaluated by an average molar absorption coefficient in the wavelength range of 200 nm to 380 nm. However, in the above conventional techniques, transmittance of lights in the ultraviolet region was evaluated, or an average molar absorption coefficient in a single light was evaluated. Therefore, it was difficult to design properly an appropriate amount and a formulation of an ultraviolet absorption agent necessary for obtaining the desired composition for ultraviolet absorption.

CITATION LIST

Patent Literature

Patent Literature 1: JP 2009-263547
Patent Literature 2: JP2013-001578

Patent Literature 3: JP 2013-170113
Patent Literature 4: JP H09-188517
Patent Literature 5: JP 2007-031216
Patent Literature 6: WO 2016/010018
Patent Literature 7: JP 2011-245474

SUMMARY OF THE INVENTION

Technical Problem

In view of such circumstances, the object of the present invention is to provide silicon doped metal oxide particles for ultraviolet absorption having an increased average molar absorption coefficient in the wavelength range of 200 nm to 380 nm. In particular, the object of the present invention is to provide silicon doped metal oxide particles for ultraviolet absorption having an increased average molar absorption coefficient in the wavelength range of 200 nm to 380 nm, by doping metal oxide particles with at least silicon. Namely, the object of the present invention is to maximally improve the characteristics originally possessed by the oxide, and to control the average molar absorption coefficient in the wavelength range of 200 nm to 380 nm by preparing silicon doped metal oxide particles for the purpose of compensating for such characteristics. In view of the above circumstances, the object of the present invention is to provide a composition for ultraviolet absorption comprising silicon doped metal oxide particles having an increased average molar absorption coefficient in the wavelength range of 200 nm to 380 nm. In particular, the object of the present invention is to provide a composition for ultraviolet absorption suitable as a composition for coating or a film like composition.

Solution to the Problem

The present inventors have found that an average molar absorption coefficient in the wavelength range of 200 nm to 380 nm of the silicon doped metal oxide particles can be significantly improved by doping metal oxide particles with silicon. And thus, the invention has been completed.

Namely, the present invention is silicon doped metal oxide particles in which the metal oxide particles are doped with silicon, wherein an average molar absorption coefficient in the wavelength range of 200 nm to 380 nm of a dispersion in which the silicon doped metal oxide particles are dispersed in a dispersion medium, is improved as compared with similar metal oxide particles not doped with silicon.

In the present invention, preferred is silicon doped metal oxide particles, in which a molar ratio (Si/M) of a metal element (M) and silicon (Si) of the silicon doped metal oxide particles is controlled, wherein an increase rate of an average molar absorption coefficient in the wavelength range of 200 nm to 380 nm of a dispersion in which the silicon doped metal oxide particles are dispersed in a dispersion medium, relative to an average molar absorption coefficient in the wavelength range of 200 nm to 380 nm of similar metal oxide particles not doped with silicon, is controlled.

In the present invention, the molar ratio (Si/M) of a metal element (M) and silicon (Si) of the silicon doped metal oxide particles is preferably in the range of 0.01 or more and 1.00 or less.

The present invention is preferably silicon doped metal oxide particles, wherein an increase rate of an average molar absorption coefficient in the wavelength range of 200 nm to 380 nm of a dispersion in which the silicon doped metal oxide particles are dispersed in a dispersion medium, relative to an average molar absorption coefficient in the wavelength range of 200 nm to 380 nm of similar metal oxide particles not doped with silicon, is 110% or more.

In the present invention, the silicon doped metal oxide particles are preferably solid solution oxide particles.

In the present invention, preferred is that at least one of the metal elements (M) is iron (Fe), and an average molar absorption coefficient in the wavelength range of 200 nm to 380 nm of a dispersion in which the silicon doped metal oxide particles are dispersed in a dispersion medium, is 1,500 L/(mol·cm) or more.

In the present invention, preferred is that at least one of the metal elements (M) is zinc (Zn), and an average molar absorption coefficient in the wavelength range of 200 nm to 380 nm of a dispersion in which the silicon doped metal oxide particles are dispersed in a dispersion medium, is 650 L/(mol·cm) or more.

In the present invention, preferred is that at least one of the metal elements (M) is cerium (Ce), and an average molar absorption coefficient in the wavelength range of 200 nm to 380 nm of a dispersion in which the silicon doped metal oxide particles are dispersed in a dispersion medium, is 4,000 L/(mol·cm) or more.

In the present invention, an average primary particle diameter of the silicon doped metal oxide particles is preferably 1 nm or more and 100 nm or less.

The present invention can be performed as a composition for ultraviolet absorption, comprising the silicon doped metal oxide particles.

Advantageous Effects of the Invention

The present invention can provide silicon doped metal oxide particles for ultraviolet absorption having an increased average molar absorption coefficient in the wavelength range of 200 nm to 380 nm as compared to similar metal oxide particles not containing silicon, by being silicon doped metal oxide particles comprising at least silicon in metal oxide particles. In particular, the present invention can facilitate design of more accurate compositions compared to the prior art in terms of the diversified use of oxide particles and the desired characteristics, because the average molar absorption coefficient in the wavelength range of 200 nm to 380 nm is enhanced by including at least silicon in iron oxide, zinc oxide or cerium oxide. In particular, the present invention can provide a composition for coating or a film like composition which can be effectively used for a coated article, a film, etc. with high transparency, which does not impair texture or appearance of the material and designability of the product, by applying the silicon doped metal oxide particles of the present invention to a composition for coating or a film like composition. Increase of the molar absorption coefficient to this level facilitates design of a composition for coating or a film like composition. Namely, absorption of ultraviolet lights becomes possible only by blending a very small amount of silicon doped metal oxide particles for ultraviolet absorption.

DESCRIPTION OF THE INVENTION

Hereinafter, the present invention is explained by embodiments of the present invention based on the drawings as an example. However, embodiments of the present invention are not limited only to the embodiments described hereinafter.

(Silicon Doped Metal Oxide Particles)

The silicon doped metal oxide particles of the present invention are silicon doped metal oxide particles wherein an average molar absorption coefficient in the wavelength range of 200 nm to 380 nm is controlled by controlling a ratio of silicon (Si) to a metal element (M) contained in the silicon doped metal oxide particles. When the silicon doped metal oxide particles of the present invention are used as a composition for coating such as a coating film and a coated body or for application on human skin, etc., or a film like composition for using for a glass, etc., the designability or texture or appearance cannot be impaired, and effective coloring is possible. Thereby, a composition for coating or a film like composition can be provided, which can be used for a coated article.

Embodiment-1 of Silicon Doped Metal Oxide Particles

The silicon doped metal oxide particles of the present invention is silicon doped metal oxide particles which contain silicon in a metal oxide obtained by a method such as reaction, crystallization, precipitation, coprecipitation, etc. The metal element (M), includes a metal element in the chemical periodic table. These metal elements may be silicon doped metal oxide particles consisting of a plurality of different metal elements as the metal constituting the metal oxide, or silicon doped metal oxide particles containing a metal element and a metalloid element. The metalloid element in the present invention is not particularly limited, but is preferably a metalloid element such as Ge, As, Sb, Te, Se and the like.

Embodiment-2 of Silicon Doped Metal Oxide Particles

The silicon doped metal oxide particles of the present invention are not limited to particles composed only of an oxide. As the silicon doped metal oxide particles of the present invention, oxide particles containing a compound other than an oxide may be also used to the extent that the compound does not affect the present invention. For example, silicon doped metal oxide particles in which oxide particles containing a compound other than an oxide are doped with silicon, or silicon doped metal oxide particles in which particles at least a part which is coated with an oxide or a compound other than an oxide are doped with silicon, may be used. Examples of the above compound other than an oxide include a hydroxide, nitride, carbide, various salts such as a nitrate and sulfate, and a hydrate and organic solvate.

Embodiment-3 of Silicon Doped Metal Oxide Particles

Figure 1:
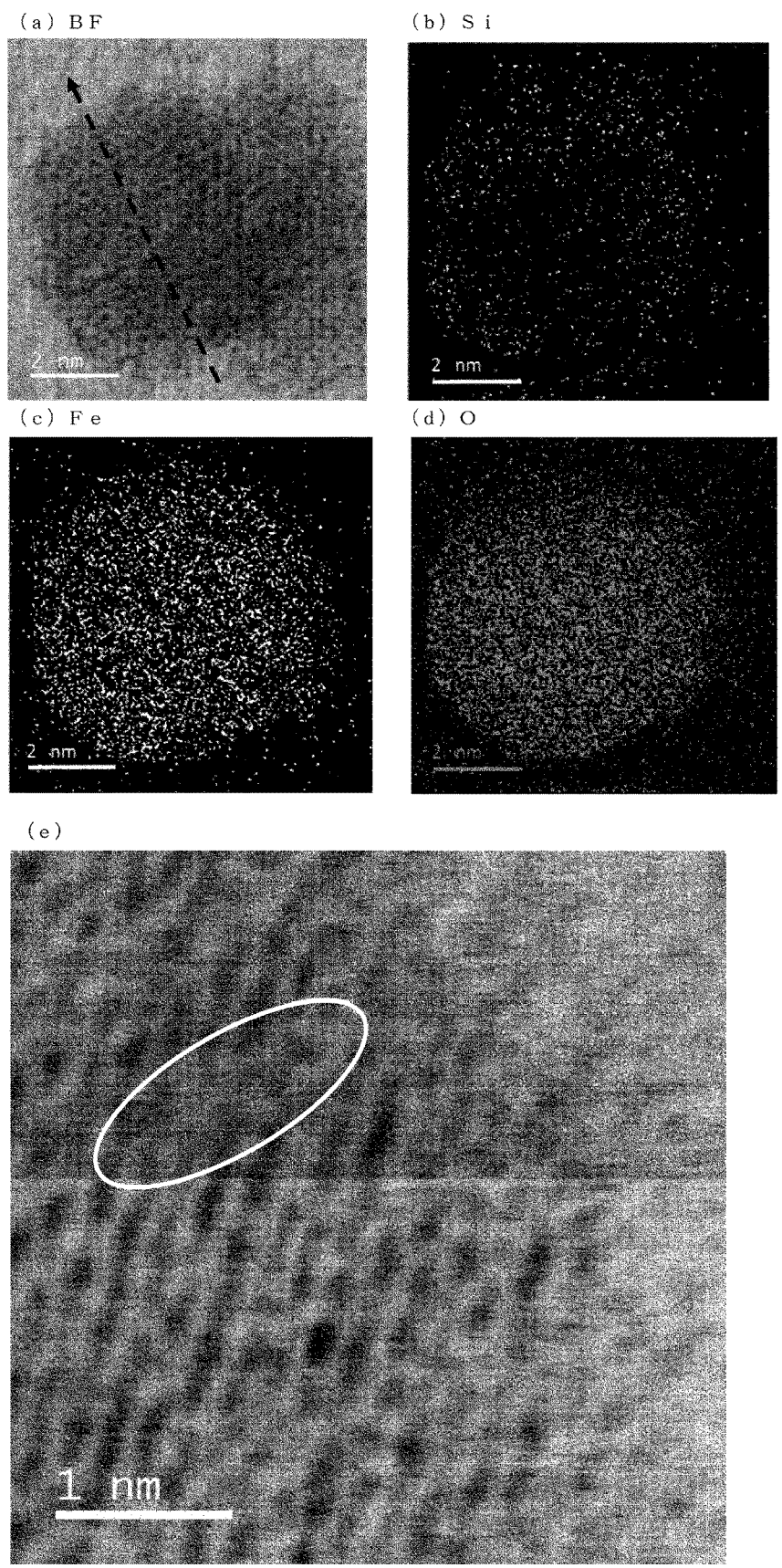
FIG. 1 shows an STEM photograph and a mapping result of the silicon doped iron oxide particles obtained in Example 1-1 of the present invention.
Figure 2:
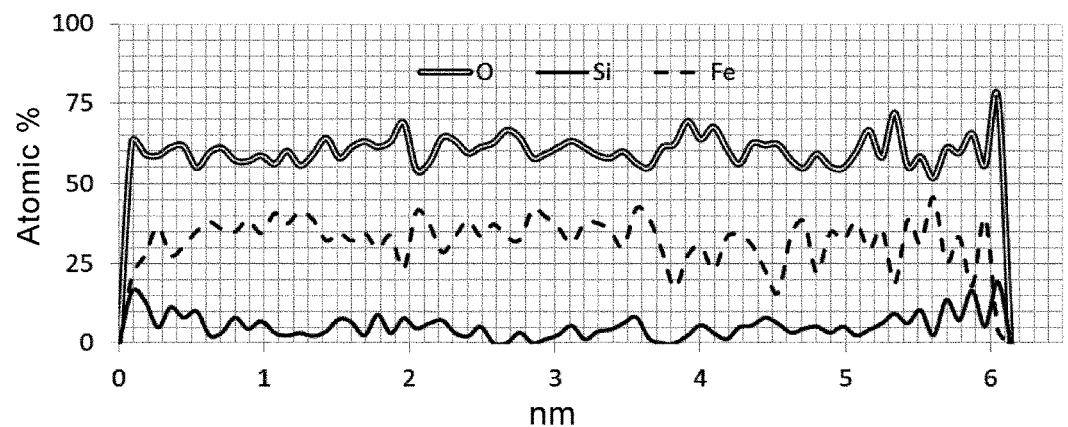
FIG. 2 shows a line analysis result of the silicon doped iron oxide particles obtained in Example 1-1 of the present invention.
Figure 3:
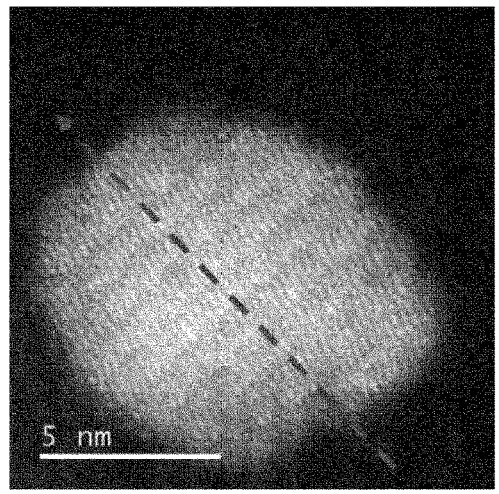
FIG. 3 shows an STEM photograph and a mapping result of the silicon doped iron oxide particles obtained in Example 1-2 of the present invention.
Figure 3:
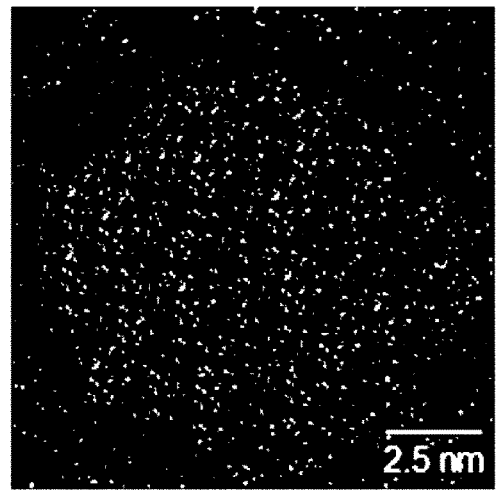
Figure 3:
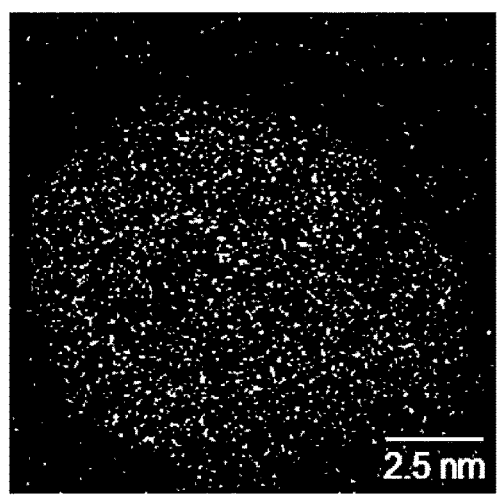
Figure 3:
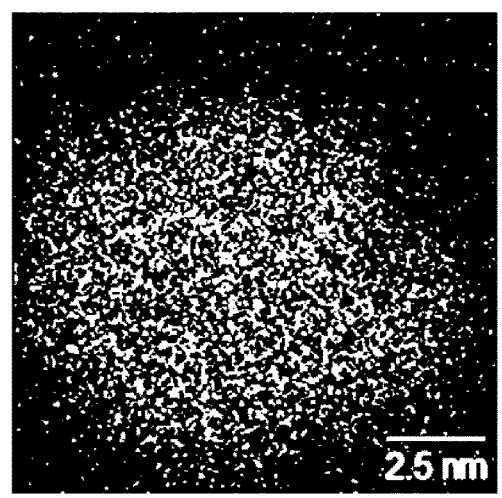
Figure 4:
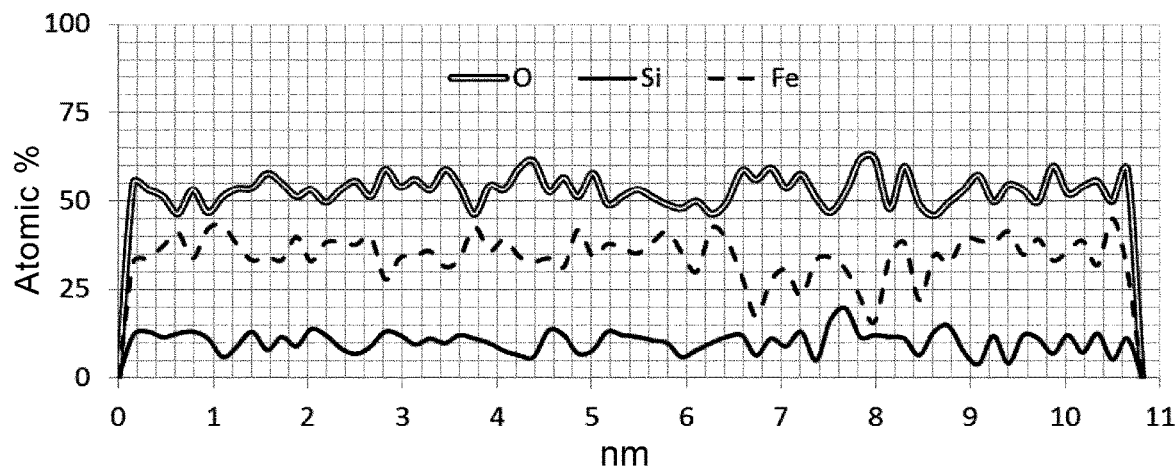
FIG. 4 shows a line analysis result of the silicon doped iron oxide particles obtained in Example 1-2 of the present invention.

As an example of the silicon doped metal oxide particles of the present invention, explained is the silicon doped iron oxide particles obtained in the later described Example 1-1 in which iron oxide is doped with silicon. FIG. 1 shows a mapping result using an STEM photograph of the silicon doped iron oxide particles obtained in Example 1-1. In FIG. 1, (a) shows a mapping result of a bright field image (BF image), (b) shows a mapping result of silicon (Si), (c) shows a mapping result of iron (Fe), and (d) shows a mapping result of oxygen (O). As seen in FIG. 1, silicon, iron and oxygen are detected in the entire particles, and silicon and iron are detected randomly. FIG. 2 shows a linear analysis result at the position indicated by the broken line in the BF image of FIG. 1, which shows the atomic % (mol %) of the elements detected in the line part from the edge to the other edge of the particle. As seen in FIG. 2, oxygen and iron are detected from the edge to the edge in the analysis range in the linear analysis. In the BF image of FIG. 1, Si is clearly detected even at the site where interference fringes of the crystal lattice are confirmed, so that it is considered that the particles are in the state in which Si is captured in the iron oxide crystal, namely, that Si is contained in the inside of the particle. According to the line analysis results, there are some sites where silicon is not detected in the inside of the particle (the sites in the line analysis of FIG. 2, where the atomic % of Si is 0), and further, some sites where atomic % of silicon is detected higher than that of iron at the surface sites of the particle, which indicates that a part or all of the surface of the particle is coated with silicon. Namely, it can be understood that silicon is contained in the inside of the particle by doping, but silicon is mainly present in the surface layer of the particle. Further, (e) in FIG. 1 is a result of further enlarged and observed bright field image of (a) (observation magnification: 50,000,000 times), and clear distortion of the crystal lattice and defect sites such as the dashed line sites are observed in (e). FIG. 3 shows a mapping result using an STEM photograph of the silicon doped iron oxide particles obtained in the later described Example 1-2. FIG. 4 shows a linear analysis result at the position indicated by the broken line in the dark field image (HAADF image) of FIG. 3. As seen in FIGS. 3 and 4, the particles obtained in Example 1-2 are different from the particles obtained in Example 1-1, and are silicon doped iron oxide particles containing silicon, oxygen and iron in the entire particles. As in Example 1-1, silicon and iron are detected randomly, and Si is clearly detected even at the site where interference fringes of the crystal lattice are confirmed, so that it is considered that the particles are in the state in which Si is captured in the iron oxide crystal, namely, that Si is contained in the inside of the particle by doping.

Figure 5:
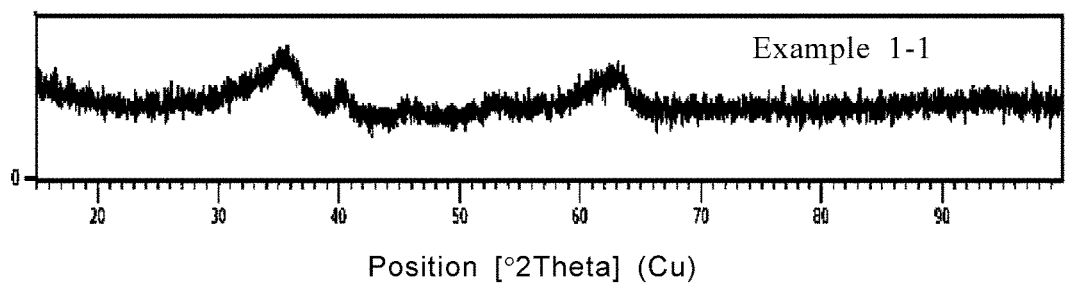
FIG. 5 shows an XRD measurement result of the silicon doped iron oxide particles obtained in Example 1-1 of the present invention and the iron oxide particles obtained in Comparative Example 1.
Figure 5:
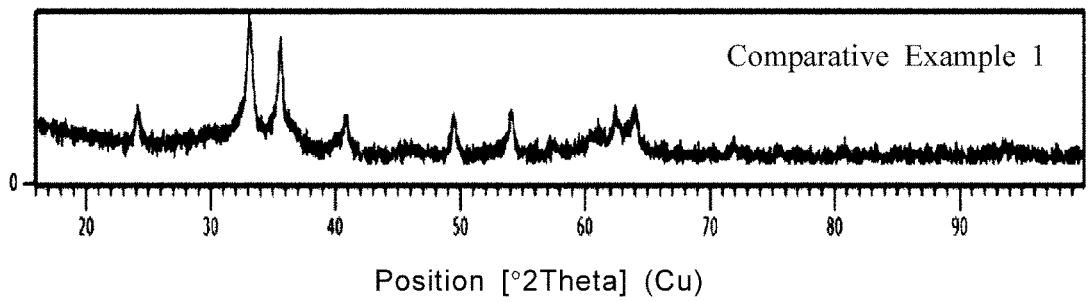

FIG. 5 shows an XRD measurement result of the silicon doped iron oxide particles obtained in Example 1-1 and an XRD measurement result of the iron oxide particles obtained in Comparative Example 1. As seen in FIG. 5, the peak of $\alpha\text{-}Fe_2O_3$ is clearly detected in the XRD measurement result of the iron oxide particles obtained in Comparative Example 1, but the peak in that of Example 1-1 is detected as a broad peak. It is considered that silicon is captured in the particle, so that distortion in the $\alpha\text{-}Fe_2O_3$ crystal may occur. Accordingly, as an example, the silicon doped metal oxide particles of the present invention may be performed as silicon doped metal oxide particles containing at least silicon in the inside of the particles. As also seen in the above STEM photograph, the silicon doped metal oxide particles are preferably solid solution oxide particles.

(Average Molar Absorption Coefficient)

A molar absorption coefficient can be calculated from an absorbance and a molar concentration of a substance to be measured in a measurement sample in ultraviolet-visible absorption spectrum measurement, by Formula 1 below.

$$\varepsilon = A/(c \cdot l) \quad \text{(Formula 1)}$$

In Formula 1, $\varepsilon$ is a constant specific to the substance, and is referred to as a molar absorption coefficient. Since it means an absorbance of a dispersion at 1 mol/L with a thickness of 1 cm, the unit is L/(mol·cm). A is an absorbance in ultraviolet-visible absorption spectrum measurement, c is a molar concentration of a sample (mol/L). l is a length through which a light is transmitted (optical path length), typically a thickness of a cell in measuring the ultraviolet-visible absorption spectrum. In the present invention, in order to show ability to absorb lights in the ultraviolet wavelength range of 200 nm to 380 nm, a simple average of the molar absorption coefficients for a plurality of wavelengths in the measurement wavelength range of 200 nm to 380 nm is calculated and evaluated as an "average molar absorption coefficient".

(Average Molar Absorption Coefficient Increase Rate)

The silicon doped metal oxide particles of the present invention are preferably silicon doped metal oxide particles in which an "average molar absorption coefficient increase rate" which is an increase rate of an average molar absorption coefficient in the wavelength range of 200 nm to 380 nm of the silicon doped metal oxide particles, relative to an average molar absorption coefficient in the same wavelength range of the metal oxide particles not doped with silicon, is controlled.

(Specific Embodiment of Molar Absorption Coefficient)

Figure 6:
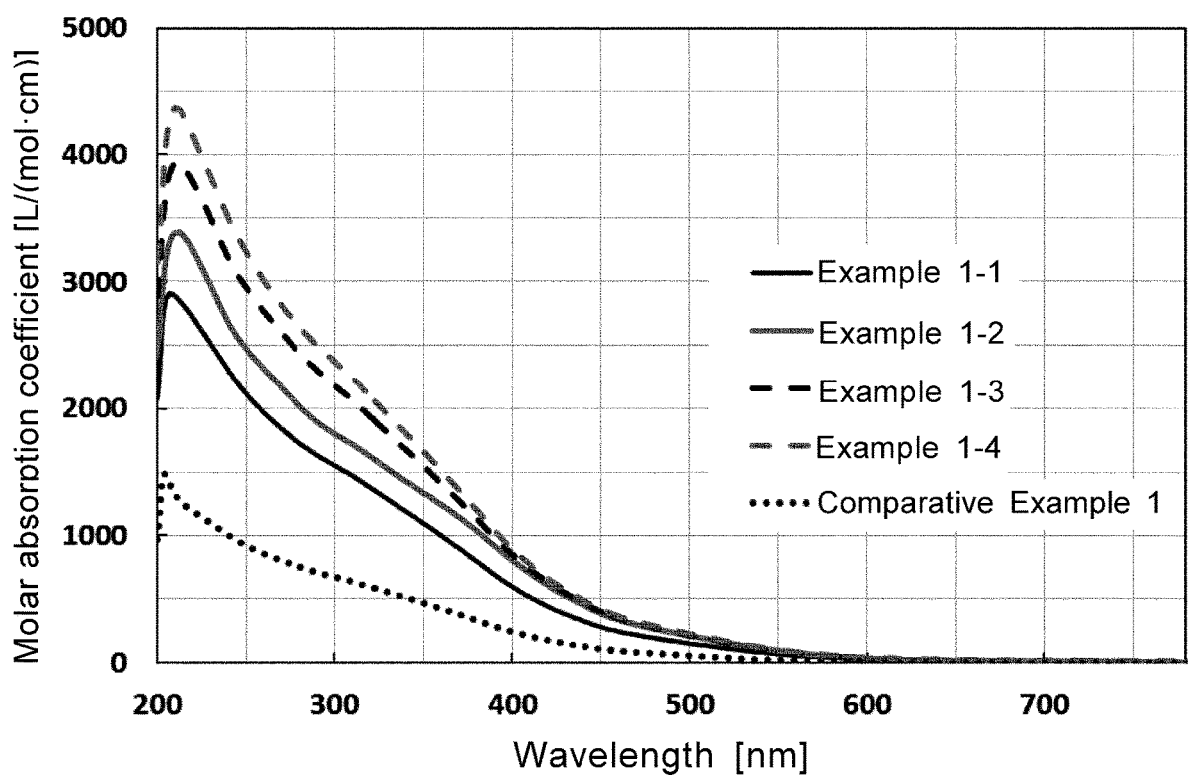
FIG. 6 shows a graph of a molar absorption coefficient of a dispersion in which the silicon doped iron oxide particles obtained in Example 1-1 to Example 1-4 of the present invention and the iron oxide particles obtained in Comparative Example 1 are dispersed in propylene glycol.

FIG. 6 shows a graph of a molar absorption coefficient of a dispersion obtained by dispersing in propylene glycol the silicon doped iron oxide particles obtained in Example 1-1 to Example 1-4 prepared by changing a molar ratio (Si/Fe (molar ratio)) of silicon (Si) to iron (Fe) contained in the silicon doped iron oxide particles of Example 1-1, and the iron oxide particles not doped with silicon obtained in Comparative Example 1. The average primary particle diameters of the silicon doped iron oxide particles obtained in Example 1-1 to Example 1-4 and the iron oxide particles obtained in Comparative Example 1 are in the range of 9.5 nm to 10 nm under all conditions, and the specific surface area can be considered to be constant. As seen in FIG. 6, it is recognized that the molar absorption coefficient in the wavelength range of 200 nm to 380 nm of silicon doped iron oxide particles increases compared to the iron oxide particles not doped with silicon (Comparative Example 1). The silicon doped metal oxide particles of the present invention are silicon doped metal oxide particles in which an average molar absorption coefficient in the wavelength range of 200 nm to 380 nm of a dispersion obtained by dispersing the silicon doped metal oxide particles in a dispersion medium, increases as compared to oxide particles consisting only of metal elements contained in the particles other than silicon. The silicon doped metal oxide particles of the present invention are preferably silicon doped metal oxide particles in which an average molar absorption coefficient increase rate in the wavelength range of 200 nm to 380 nm of a dispersion obtained by dispersing the silicon doped metal oxide particles in a dispersion medium, is controlled to be 110% or more.

(Silicon Doping and Factors of Molar Absorption Coefficient Increase)

Factors of increase of a molar absorption coefficient of the silicon doped metal oxide particles of the present invention by silicon doping are not certain. Primarily, absorption of a light by a substance is considered to be absorption of a light of a specific wavelength (light energy) based on an electronic transition according to the energy level specific to the substance. The present applicant believes that the factors of increase of light absorption efficiency against a same quantity of lights are as follows. By doping the metal oxide particle with silicon, distortion of the crystal lattice may occur, new bonds due to random combination of-metaloxygen-silicon-occur, or a defective site of oxygen or a defective site of metal or silicon, etc. occurs, which result in an increase in light absorption ability due to occurrence of an energy level not similar to the energy levels originally possessed by the metal oxide particles (an increase of the energy level number), and an increase in light absorption ability caused by enabling a light absorbed only in the vicinity of the surface layer of the particle to enter in the inside of the particle (an increase in light absorption efficiency of a material). These increases raise a molar absorption coefficient of the silicon doped metal oxide particles. These mechanisms are the factors of increase of light absorption efficiency against a same quantity of lights.

Preferable Embodiment-1 of Silicon Doped Metal Oxide Particles

In the present invention, a primary particle diameter of the silicon doped metal oxide particles is preferably 1 nm or more and 100 nm or less, more preferably 1 nm or more and 50 nm or less. As described above, it is assumed that by constituting the oxide multiply with a metal element and silicon contained in the silicon doped metal oxide particles, a molar absorption coefficient of the silicon doped metal oxide particles can be increased, and the surface of the particles can significantly affect these properties, and the like. Thereby, it is understood that the silicon doped metal oxide particles having a primary particle diameter of 100 nm or less have surface areas greater than the silicon doped metal oxide particles having a primary particle diameter of more than 100 nm, and that control of a molar ratio of silicon (Si) to a metal element (M) in the silicon doped metal oxide particles greatly affects an average molar absorption coefficient of the silicon doped metal oxide particles. Therefore, in the oxide particles having a primary particle diameter of 100 nm or less, it is an advantage that predetermined average molar absorption coefficient (particularly average molar absorption coefficient suitable for using as a coating material or a film) can be suitably exerted by controlling a molar ratio of silicon (Si) to a metal element (M) contained in the silicon doped metal oxide particles.

Preferable Embodiment-2 of Silicon Doped Metal Oxide Particles

In the present invention, at least a part of the surface of the silicon doped metal oxide particles may be coated with a various compound. Examples of the compound include an aluminum compound such as aluminum oxide, a calcium compound such as calcium phosphate and apatite, a titanium compound such as titanium oxide, and a silicon compound such as silicon oxide. By these coatings, in addition to control of an average molar absorptivity coefficient in the present invention, control of color characteristics such as reflection characteristics, transmission characteristics and hue is possible. Control of an average molar absorption coefficient to the extent that is not possible by only the control method of the present invention, is also possible. Further, by optionally coating the surface of the particles, a resin contained in a coated body and the like can be protected from photocatalytic ability increased by increase of a molar absorption coefficient in the wavelength range of 200 nm to 380 nm. Regarding the coated silicon doped metal oxide particles, a primary particle diameter of the silicon doped metal oxide particles themselves is also preferably 100 nm or less, more preferably 50 nm or less. In case that the silicon doped metal oxide particles are constituted by an aggregate of a plurality of the silicon doped metal oxide particles, a size of the aggregate is preferably 100 nm or less, more preferably 50 nm or less.

(Method of Producing Silicon Doped Metal Oxide Particles: Preferable Method-1)

As an example of a method of producing silicon doped metal oxide particles of the present invention, it is preferable to use a method of producing silicon doped metal oxide particles by providing an oxide raw material liquid containing at least a raw material of silicon doped metal oxide particles and an oxide precipitation solvent containing at least an oxide precipitating substance for precipitating oxide particles, and precipitating silicon doped metal oxide particles by a method such as reaction, crystallization, precipitation and coprecipitation, in a mixed fluid in which the oxide raw material liquid and the oxide precipitation solvent are mixed. A metal element and silicon contained in the silicon doped metal oxide particles may be contained together in the oxide raw material liquid, or may be contained in the oxide raw material liquid and the oxide precipitation solvent respectively, or may be contained in both the oxide raw material liquid and the oxide precipitation solvent.

(Raw Material of Silicon Doped Metal Oxide Particles)

A raw material of silicon doped metal oxide particles of the present invention is not particularly limited. Any substances can be used as long as the substances become oxide particles in a method such as a reaction, crystallization, precipitation, coprecipitation or the like. The examples include, for example, a simple substance or a compound of the metal or silicon. In the present invention, hereinafter, a compound of the metal or silicon is referred to as a compound. The compound is not particularly limited, but includes, for example, a salt, an oxide, a hydroxide, a hydroxide oxide, a nitride, a carbide, a complex, an organic salt, an organic complex, an organic compound of the metal or silicon, or a hydrate thereof, an organic solvate thereof, and the like. A metal salt or a silicon salt is not particularly limited, but includes a nitrate, a nitrite, a sulfate, a sulfite, a formate, an acetate, a phosphate, a phosphite, a hypophosphite, a chloride, an oxy salt, an acetylacetonate of the metal or silicon, or a hydrate thereof, an organic solvate thereof and the like. An organic compound includes an alkoxide of the metal or silicon, and the like. These metal compound or silicon compound may be used alone, or a mixture of a plurality of these compounds may be used.

(Raw Material of Silicon Oxide)

Examples of the raw material including silicon include a silicon oxide, a silicon hydroxide, other compounds such as a silicon salt and a silicon alkoxide, and a hydrate thereof. Not particularly limited, it includes a silicate such as sodium silicate, phenyltrimethoxysilane, methyltrimethoxysilane, methyltriethoxysilane, 3-glycidoxypropyltrimethoxysi lane, 3-trifluoropropyl-trimethoxysilane, methacryloxypropyltriethoxysilane, tetramethoxysilane (TMOS), tetraethoxysilane (TEOS), and an oligomeric condensate of TEOS, for example, ethyl silicate 40, tetraisopropylsilane, tetrapropoxysilane, tetraisobutoxysilane, tetrabutoxysilane, and a similar material thereof. Further as a raw material of silicon oxide, another siloxane compound, bis(triethoxysilyl)methane, 1,9-bis(triethoxysilyl)nonane, diethoxydichlorosilane, triethoxychlorosilane and the like may be used. In the silicon doped metal oxide particles of the present invention, a molar ratio of silicon (Si) to a metal element (M) constituting the silicon doped metal oxide particles is preferably 0.01 or more and 1.00 or less.

Further, when a raw material of the silicon doped metal oxide particles is a solid, the raw material is preferably used in a molten state, or in a state of being mixed or dissolved in a solvent described below, including a dispersion state. Even when a raw material is a liquid or gas, it is preferably used in a state of being mixed or dissolved in a solvent described below, including a dispersion state.

(Oxide Precipitating Substance)

The oxide precipitation substance is not particularly limited as long as the substance can make a raw material of silicon doped metal oxide particles contained in an oxide raw material liquid be precipitated as silicon doped oxide particles. For example, an acidic substance or a basic substance may be used. An oxide precipitation substance is preferably used at least in a state of being mixed, dissolved or molecularly dispersed in a solvent described below.

(Basic Substance)

The basic substance includes a metal hydroxide such as sodium hydroxide and potassium hydroxide, a metal alkoxide such as sodium methoxide and sodium isopropoxide, an amine compound such as triethylamine, diethylaminoethanol and diethylamine, ammonia and the like.

(Acidic Substance)

The acidic substance includes an inorganic acid such as aqua regia, hydrochloric acid, nitric acid, fuming nitric acid, sulfuric acid, fuming sulfuric acid, and an organic acid such as formic acid, acetic acid, chloroacetic acid, dichloroacetic acid, oxalic acid, trifluoroacetic acid, trichloroacetic acid, citric acid and the like.

(Solvent)

A solvent used in an oxide raw material liquid and an oxide precipitation solvent includes, for example, water, an organic solvent, or a mixed solvent of a plurality of these solvents. The water includes tap water, ion exchange water, pure water, ultrapure water, RO water (reverse osmosis water) and the like. The organic solvent includes, an alcohol solvent, an amide solvent, a ketone solvent, an ether solvent, an aromatic compound solvent, carbon disulfide, an aliphatic compound solvent, a nitrile solvent, a sulfoxide solvent, a halogen compound solvent, an ester solvent, an ionic liquid, a carboxylic acid compound, a sulfonic acid compound and the like. Each of the solvents may be used alone, or a plurality of them may be mixed and used. An alcohol solvent includes a monohydric alcohol such as methanol and ethanol, a polyol such as ethylene glycol and propylene glycol, and the like.

(Dispersing Agent and the Like)

Various dispersing agents or surfactants may be used depending on a purpose or necessity in the present invention, as long as they do not adversely affect production of the silicon doped metal oxide particles. Not particularly limited, as a dispersing agent or a surfactant, various generally used commercial products or products, and newly synthesized products and the like may be used. As an example, a dispersing agent such as an anionic surfactant, a cationic surfactant, a nonionic surfactant, and various polymers and the like may be used. These may be used alone or two or more thereof may be used in combination. The surfactant and dispersing agent may be contained in at least one fluid of the oxide raw material liquid and the oxide precipitation solvent. In addition, the surfactant and dispersing agent may be contained in another fluid different from the oxide raw material liquid and the oxide precipitation solvent.

(Method of Producing Silicon Doped Metal Oxide Particles: Method Outline)

In the present invention, as described above, firstly, at least a metal element and silicon contained in the silicon doped metal oxide particles preferably exist together at least in the inside of the particles. In producing silicon doped metal oxide particles by precipitation or the like, it is preferable to produce the silicon doped metal oxide particles by precipitating oxides of a plurality of different elements at substantially the same time. For example, as an example of a method of producing silicon doped iron oxide particles by a liquid phase method, in the case that silicon doped iron oxide particles being the silicon doped metal oxide particles are precipitated by mixing an oxide raw material liquid obtained by dissolving iron nitrate nonahydrate as a raw material of iron oxide ($\alpha$-$Fe_2O_3$) and tetraethyl orthosilicate (TEOS) being one of silicon compounds as a raw material of silicon for doping in an acidic aqueous solution, with an oxide precipitation solvent which is an aqueous solution of an alkali metal hydroxide such as sodium hydroxide, it is necessary to precipitate the silicon doped iron oxide particles by mixing the oxide precipitation solvent having pH of 14 or more, to the oxide raw material liquid having pH of about 1 to 2, preferably less than 1. An oxide containing silicon tends to precipitate in the pH range of 7 to 12, and iron oxide tends to precipitate in the pH range of 6 or more. For example, in the case that a basic oxide precipitation solvent is gradually added to an acidic oxide raw material liquid, pH of the mixed liquid of the oxide raw material liquid and the oxide precipitation solvent gradually changes from acidic to basic, and at first when the pH becomes close to pH 6, iron oxide precipitates or begins to precipitate, and later when the pH becomes close to pH 7, silicon oxide precipitates. It may be understood that iron oxide particles and silicon oxide particles precipitate step by step as explained above. In that case, it is difficult to prepare silicon doped metal oxide particles containing both a metal element and silicon in the inside of the particles. By instantaneously adjusting the pH of the mixed liquid to a pH at which both iron oxide and silicon oxide precipitate, the apparent precipitation can be made simultaneously, so that at least premise conditions for producing silicon doped metal oxide particles containing both silicon and iron in the inside of the particles can be arranged.

(Method of Producing Silicon Doped Metal Oxide Particles: Apparatus)

A method of producing the silicon doped metal oxide particles of the present invention includes, for example, a method of producing the silicon doped metal oxide particles by using a microreactor, or by a reaction in a dilute system in a batch vessel or the like, and the like. The apparatus and method as proposed by the present applicant and described in JP 2009-112892 may be also used for producing the silicon doped metal oxide particles. The apparatus described in JP 2009-112892 comprises a stirring tank having an inner peripheral surface which cross-section is circular, and a mixing tool attached to the stirring tank with a slight gap to the inner peripheral surface of the stirring tank, wherein the stirring tank comprises at least two fluid inlets and at least one fluid outlet; from one of the fluid inlets, the first fluid to be processed containing one of the reactants among the fluids to be processed is introduced into the stirring tank; from one fluid inlet other than the above inlet, the second fluid to be processed containing one of reactants different from the above reactant is introduced into the stirring tank through a different flow path; at least one of the stirring tank and the mixing tool rotates at a high speed relative to the other to let the above fluids be in a state of a thin film; and in the above thin film, the reactants contained in the first and second fluids to be processed are reacted. JP 2009-112892 further describes that three or more inlet tubes may be provided as shown in FIGS. 4 and 5 of JP 2009-112892 to introduce three or more fluids to be processed into the stirring tank. As an example of the microreactor, an apparatus using the same principle as the fluid processing apparatus described in Patent Literatures 6 and 7 can be used. Alternatively, the silicon doped metal oxide particles may be prepared by using a pulverization method such as a beads mill and the like to coarse silicon doped metal oxide particles.

(An Example of a Composition for Ultraviolet Absorption: A Composition for Coating or a Film Like Composition-1)

A silicon doped metal oxide composition for coating or a film like silicon doped metal oxide which is an example of a composition for ultraviolet absorption of the present invention, can be applied for those described in JP 2014-042891, JP 2014-042892 and JP 2016-107427, and, for example, a composition for coating or a film like composition intended for various coatings such as solvent based coatings and aqueous coatings, but is not particularly limited. The above oxide composition for coating, if necessary, may further comprise an additive such as a pigment, dye, wetting agent, dispersing agent, color separation inhibitor, leveling agent, viscosity modifier, anti-skinning agent, anti-gelling agent, antifoaming agent, thickener, anti-sagging agent, antifungal agent, ultraviolet absorber, film-forming assistant agent, surfactant, resin component, if necessary, depending on its purpose. A resin component for coating purpose includes polyester resins, melamine resins, phenol resins, epoxy resins, vinyl chloride resins, acrylic resins, urethane resins, silicone resins, fluorine resins and the like. A coating material which a paint containing the silicon doped metal oxide composition for coating of the present invention is applied to, may be a single layer coating material composed of a single composition for coating, or a multilayer coating material composed of a plurality of a composition for coating such as laminated coating film as described in JP 2014-042891, JP 2014-042892 or JP 2016-107427. The coating material may be performed by adding it to a paint containing a pigment, or to a paint such as a clear paint. In the case where the above film like composition is aimed, if necessary, a binder resin, curing agent, curing catalyst, leveling agent, surfactant, silane coupling agent, defoaming agent, coloring agent such as a pigment or dye, antioxidant and the like may be contained.

(An Example of a Composition for Ultraviolet Absorption: A Composition for Coating or a Film Like Composition-2)

The silicon doped metal oxide composition for coating or the film like silicon doped metal oxide composition of the present invention, comprises silicon doped metal oxide particles such as powers of oxide particles; a dispersion wherein silicon doped metal oxide particles are dispersed in a liquid dispersion medium; and a dispersion wherein silicon doped metal oxide particles are dispersed in a solid such as glass and resin or a liquid before solidification, and the like. Silicon doped metal oxide particles contained in the above silicon doped metal oxide composition for coating or the film like silicon doped metal oxide composition may be composed of one silicon doped metal oxide particle, or may be composed of an aggregate of a plurality of silicon doped metal oxide particles, or may be composed of both of those. When the silicon doped metal oxide particles are composed of an aggregate of a plurality of silicon doped metal oxide particles, a size of the aggregate is preferably 100 nm or less, more preferably 50 nm or less. Further, the silicon doped metal oxide composition may be used and dispersed in cosmetics or a paint together with various pigments, or may be overcoated on a coating film. Furthermore, silicon doped metal oxide particles can also be used as a sole pigment. Further, the liquid dispersion medium includes water such as tap water, distilled water, RO water (reverse osmosis water), pure water and ultrapure water; an alcohol solvent such as methanol, ethanol and isopropyl alcohol; a polyhydric alcohol solvent such as propylene glycol, ethylene glycol, diethylene glycol and glycerine; an ester solvent such as ethyl acetate and butyl acetate: an aromatic solvent such as benzene, toluene and xylene; a ketone solvent such as acetone and methyl ethyl ketone; a nitrile solvent such as acetonitrile: silicone oil, a vegetable oil, a wax and the like. These may be used alone or two or more thereof may be used in combination.

(An Example of a Composition for Ultraviolet Absorption: Colors of a Composition for Coating or a Film Like Composition)

Colors of a coating material, a film or a glass, are not particularly limited. A silicon doped metal oxide composition for coating or a film like composition of the present invention can be used for any desired hue. The color may be a white color, gray color or black color such as color of white color of a lightness of 10 to black color of a lightness of 0 in the Munsell color system, a red color such as color having a hue from RP to YR in the Munsell hue circle; a yellow to green color such as a color having a hue from Y to BG in the Munsell hue circle; a blue to purple color such as a color having a hue from B to P in the Munsell hue circle (each of these colors includes a metallic color) may be blended to a composition for coating used for a coating material. However, the present invention is not limited to these colors, and may be a color of any other hues. In addition, by using a composition for coating containing the silicon doped metal oxide particles of the present invention to a top coat of a coating film or coated body exhibiting these colors, impairment of coloring of each color can be remarkably reduced, and designability of a coated body can be enhanced, which is suitable. As a pigment or dye optionally included in a composition for coating, various pigments and dyes may be used, and for example, all pigments and dyes registered in the color index may be used. Among these colors, a pigment or dye constituting a pigment constituting a green color includes, for example, a pigment or dye classified into C. I. Pigment Green; a pigment constituting a blue color includes, for example, a pigment or dye classified into C. I. Pigment Blue; a pigment constituting a white color includes, for example, a pigment or dye classified into C. I. Pigment White; a pigment constituting a yellow color includes, for example, a pigment or dye classified into C. I. Pigment Yellow; a red color includes, for example, a pigment or dye classified into C. I. Pigment Red in the Color Index, a pigment or dye classified into C. I. Pigment Violet or C. I. Pigment Orange in the Color Index, and the like. More specific examples include a quinacridone pigment such as C. I. Pigment Red 122 and C. I. Violet 19; a diketopyrrolopyrrole pigment such as C. I. Pigment Red 254 and C. I. Pigment Orange73; a naphthol pigment such as C. I. Pigment Red 150 and C. I. Pigment Red 170; a perylene pigment such as C. I. Pigment Red 123 and C. I. Pigment Red 179; and an azo pigment such as C. I. Pigment Red 144, and the like. These pigments and dyes may be used alone, or a plurality of these may be mixed and used. The silicon doped metal oxide composition of the present invention may be also mixed in a composition for coating or a film like composition alone without mixing with the above pigments and dyes and the like. By including the above silicon doped metal oxide particles in the composition for coating of the present invention, a coating material having higher chroma and a large difference between the highlight and the shade, can be constructed when using for laminated coating as described in, for example, JP 2014-042891, JP 2014-042892 and JP 2016-107427. It is preferable because white blurring is prevented in the shade, and the jet black color increases, and a sharp metallic texture is obtained. Further, by including the silicon doped metal oxide particles in a film like composition for use in a transparent substrate such as glasses used in buildings, vehicles, displays, etc., ultraviolet lights can be effectively absorbed, safety to humans can be increased, decomposition of organic substances in buildings and vehicles can be suppressed, the amount used can be reduced, and high transmission characteristics for the visible lights can be obtained, and thereby a film or glass having high transparency can be obtained, which is preferable.

EXAMPLE

Hereinafter, the present invention is explained in more detail with reference to examples, but the present invention is not limited only to these examples. Pure water having conductivity of 0.88 μS/cm (measurement temperature: 20° C.) was used for pure water in the following examples, unless otherwise noted.

(Preparation of TEM Observation Sample and Preparation of STEM Observation Sample)

A part of the wet cake samples of the silicon doped metal oxide particles obtained in Examples was dispersed in propylene glycol, and further was diluted to 100 fold by isopropyl alcohol (IPA). The resulting diluted liquid was dropped to a collodion membrane or a micro grid, and dried to prepare a TEM observation sample or an STEM observation sample.

(Transmission Electron Microscopy and Energy Dispersive X-Ray Analyzer: TEM-EDS Analysis)

For observation and quantitative analysis of the oxide particles by TEM-EDS analysis, the transmission electron microscopy JEM-2100 (JEOL Ltd.) equipped with the energy dispersive X-ray analyzer JED-2300 (JEOL Ltd.) was used. The observation condition was the acceleration voltage of 80 kV, and the observation magnification of 25,000 times or more. The particle diameters were calculated from the maximum distance between two points on the outer periphery of the silicon doped metal oxide particles observed by TEM, and the average value of the measured particle diameters of 100 particles (average primary particle diameter) was calculated. A molar ratio of the elemental components contained in the silicon doped metal oxide particles was calculated by TEM-EDS, and the average value of the results of calculated molar ratio for 10 or more particles was calculated.

(Scanning Transmission Electron Microscopy and Energy Dispersive X-Ray Analyzer: STEM-EDS Analysis)

For the mapping and quantification of elements contained in the oxide particles by STEM-EDS analysis, the atomic resolution analytical electron microscopy JEM-ARM200F (JEOL Ltd.) equipped with the energy dispersive X-ray analyzer Centurio (JEOL Ltd.) was used. The observation condition was the acceleration voltage of 80 kV and the observation magnification of 50,000 times or more, and a beam diameter of 0.2 nm was used for analysis.

(X-Ray Diffraction Measurement)

For the X-ray diffraction (XRD) measurement, the powder X-ray diffractometer Empyrean (Spectris Co., Ltd., PANalytical Division) was used. The measurement condition was measurement range of 10 to 100 [° 2Theta], Cu anticathode, tube voltage of 45 kV, tube current of 40 mA, and scanning speed of 0.3*/min. The XRD was measured using the dry powder of the oxide particles obtained in each Example.

(Absorption Spectrum)

Absorption spectrum was measured by ultraviolet visible near infrared spectroscopy (product name: V-770, JASCO Corporation). Measurement range was 200 nm to 800 nm, the sampling rate was 0.2 nm, and the measurement speed was low speed. After measuring absorption spectrum, a molar absorption coefficient at each measurement wavelength was calculated from the absorbance obtained from the measurement result and the concentration of oxide particles in the dispersion, and the graph was prepared showing the measurement wavelength on the horizontal axis and the molar absorption coefficient on vertical axis. A liquid cell of thickness of 1 cm was used for measurements. Also, the molar absorption coefficients measured at a plurality of wavelengths from 200 nm to 380 nm were simply averaged so that the average molar absorption coefficient was calculated.

Example 1

Hereinafter, Example 1 describes silicon doped iron oxide particles containing silicon in at least the inside of iron oxide particles as the silicon doped metal oxide particles. An oxide raw material liquid (liquid A) and an oxide precipitation solvent (liquid B) were prepared using the high-speed rotary dispersion emulsification apparatus CLEAMIX (product name: CLM-2.2 S, M. Technique Co., Ltd.). Specifically, based on the formulation of the oxide raw material liquid shown in Example 1 of Table 1, the components of the oxide raw material liquid were mixed homogeneously by stirring using CLEARMIX at preparation temperature of 40° C. and at the rotor rotational speed of 20,000 rpm for 30 min to prepare the oxide raw material liquid. Based on the formulation of the oxide precipitation solvent shown in Example 1 of Table 1, the components of the oxide precipitation solvent were mixed homogeneously by stirring using CLEARMIX at preparation temperature of 45° C. and at the rotor rotational speed of 15,000 rpm for 30 min to prepare the oxide precipitation solvent.

Regarding the substances represented by the chemical formula and abbreviations set forth in Table 1, 60 wt % $HNO_3$ is concentrated nitric acid (Kishida Chemical Co., Ltd.), NaOH is sodium hydroxide (Kanto Chemical Co., Inc.), TEOS is tetraethyl orthosilicate (Wako Pure Chemical Industry Ltd.), and $Fe(NO_3)_3 \cdot 9H_2O$ is iron nitrate nonahydrate (Kanto Kagaku Co., Ltd.). Further, the conditions in which the concentration of TEOS contained in the oxide raw material liquid was changed were set to Example 1-1 to Example 1-4. Table 1 also describes the conditions for iron oxide particles not doped with silicon which were produced in Comparative Example 1.

Then, the prepared oxide raw material liquid and the oxide precipitation solvent were mixed using the fluid processing apparatus described in Patent Literature 6 filed by the present applicant. Here, the fluid processing apparatus described in Patent Literature 6 is an apparatus described in FIG. 3 of Patent Literature 6, wherein the opening of the second introduction part d20 has concentric annular shapes which are surrounding the central opening of the processing surface 2 which is a ring-shaped disc, which was used. Specifically, the oxide raw material liquid as liquid A was introduced from the first introduction part d1 into the space between the processing surfaces 1 and 2, and while driving the processing member 10 at a rotational speed of 1,700 rpm, the oxide precipitation solvent as liquid B was introduced from the second introduction part d2 into the space between the processing surfaces 1 and 2, and the oxide raw material liquid and the oxide precipitation solvent were mixed in the thin film fluid, to let the silicon doped metal oxide particles be precipitated in the space between the processing surfaces 1 and 2. In Example 1, the silicon doped iron oxide particles were precipitated. The discharge liquid containing the silicon doped iron oxide particles (hereinafter, the silicon doped iron oxide particle dispersion) was discharged from the space between the processing surfaces 1 and 2 of the fluid processing apparatus. The silicon doped iron oxide particle dispersion was collected in the beaker b through the vessel v. In Example 1, the third introducing part d30 and liquid C were not used.

Table 2 shows the operating conditions of the fluid processing apparatus, and the average primary particle diameters calculated from the TEM observation result of the silicon doped iron oxide particles, and the molar ratios of Si/Fe calculated from TEM-EDS analysis, and the calculated values calculated from the formulations and introduction flow rates of liquid A and liquid B. The introduction temperatures (liquid sending temperatures) and the introduction pressures (liquid sending pressures) of liquid A and liquid B shown in Table 2 were measured using a thermometer and a pressure gauge provided in a sealed inlet path leading to the space between the processing surfaces 1 and 2 (the first introduction part d1 and the second introduction part d2). The introduction temperature of liquid A shown in Table 2 is the actual temperature of liquid A under the introduction pressure in the first introduction part d1. Similarly, the introduction temperature of liquid B shown in Table 2 is the actual temperature of liquid B under the introduction pressure in the second introduction part d2.

For the pH measurement, the pH meter, model number D-51 manufactured by HORIBA Ltd. was used. The pH of liquid A and liquid B were measured at room temperature prior to introduction into the fluid processing apparatus. Further, it is difficult to measure the pH of the mixed fluid immediately after mixing the oxide raw material liquid and the oxide precipitation solvent. Therefore, the silicon doped oxide particle dispersion liquid was discharged from the apparatus and collected in a beaker b, and the pH of the liquid was measured at room temperature.

Dry powders and wet cake samples were produced from the silicon doped iron oxide particle dispersion liquid which was discharged from the fluid processing apparatus, and collected in the beaker. The manufacturing method was conducted according to a conventional method of this type of processing. The discharged silicon doped iron oxide particle dispersion liquid was collected, and the silicon doped iron oxide particles were settled, and the supernatant was removed. Thereafter, the silicon doped iron oxide particles were washed and settled three times repetitively with 100 parts by weight of pure water, and then, were washed and settled three times repetitively with pure water. A part of the finally obtained wet cake of the silicon doped iron oxide particles was dried at 25° C. at −0.10 MPaG for 20 hours to obtain the dry powders. The rest was the wet cake sample.

TABLE 1

| | | Formulation of the 1st fluid (liquid A) | | | | | | | | |
|---|---|---|---|---|---|---|---|---|---|---|
| | | Formulation | | | | | | | | pH |
| | | Raw material | [wt %] | Raw material | [wt %] | Raw material | [wt %] | Raw material | [wt %] | pH | [° C.] |
| Example 1-1 | Oxide raw material liquid | $Fe(NO_3)_3 \cdot 9H_2O$ | 2.000 | TEOS | 0.066 | 60 wt % $HNO_3$ | 0.660 | Pure water | 97.274 | 1.04 | 26.1 |
| Example 1-2 | | $Fe(NO_3)_3 \cdot 9H_2O$ | 2.000 | TEOS | 0.149 | 60 wt % $HNO_3$ | 0.660 | Pure water | 97.191 | 1.06 | 28.3 |
| Example 1-3 | | $Fe(NO_3)_3 \cdot 9H_2O$ | 2.000 | TEOS | 0.414 | 60 wt % $HNO_3$ | 0.660 | Pure water | 96.926 | 1.06 | 28.4 |
| Example 1-4 | | $Fe(NO_3)_3 \cdot 9H_2O$ | 2.000 | TEOS | 0.994 | 60 wt % $HNO_3$ | 0.660 | Pure water | 96.346 | 1.07 | 28.3 |
| Comparative Example 1 | | $Fe(NO_3)_3 \cdot 9H_2O$ | 2.000 | — | — | — | — | Pure water | 98.000 | 1.80 | 26.6 |

| | Formulation of the 2nd fluid (liquid B) | | | | | |
|---|---|---|---|---|---|---|
| | Formulation | | | | pH | |
| | Raw material | [wt %] | Raw material | [wt %] | pH | [° C.] |
| Example 1-1 Oxide precipitation solvent | NaOH | 9.00 | Pure water | 91.00 | >14 | — |
| Example 1-2 | NaOH | 9.00 | Pure water | 91.00 | >14 | — |
| Example 1-3 | NaOH | 9.00 | Pure water | 91.00 | >14 | — |
| Example 1-4 | NaOH | 9.00 | Pure water | 91.00 | >14 | — |
| Comparative Example 1 | NaOH | 9.00 | Pure water | 91.00 | >14 | — |

TABLE 2

| | Introduction flow rate (liquid sending flow rate) [ml/min] | | Introduction temperature (liquid sending temperature) [° C.] | | Introduction pressure (liquid sending pressure) [MPaG] | | Discharged liquid | | Si/Fe [molar ratio] | | Average primary particle diameter [nm] |
|---|---|---|---|---|---|---|---|---|---|---|---|
| | Liquid A | Liquid B | Liquid A | Liquid B | Liquid A | Liquid B | pH | Temperature [° C.] | [Calculated value] | [EDS] | |
| Example 1-1 | 400 | 40 | 140 | 85 | 0.388 | 0.10 | 10.95 | 21.1 | 0.06 | 0.06 | 9.59 |
| Example 1-2 | 400 | 40 | 140 | 86 | 0.392 | 0.10 | 10.98 | 22.3 | 0.14 | 0.14 | 9.65 |
| Example 1-3 | 400 | 40 | 141 | 87 | 0.382 | 0.10 | 11.02 | 21.6 | 0.40 | 0.40 | 9.54 |
| Example 1-4 | 400 | 40 | 141 | 84 | 0.379 | 0.10 | 11.03 | 21.6 | 0.96 | 0.96 | 9.69 |
| Comparative Example 1 | 400 | 40 | 142 | 86 | 0.436 | 0.10 | 11.59 | 29.9 | — | — | 9.53 |

FIG. 1 shows a mapping result using an STEM photograph of the silicon doped iron oxide particles obtained in Example 1-1. In FIG. 1, (a) shows a mapping result of a bright field image (BF image), (b) shows a mapping result of silicon (Si), (c) shows a mapping result of iron (Fe), and (d) shows a mapping result of oxygen (O). As seen in FIG. 1, silicon, iron and oxygen are detected in the entire particles, and silicon and iron are detected randomly. FIG. 2 shows a linear analysis result at the position indicated by the broken line in the BF image of FIG. 1, which shows the atomic % (mol %) of the elements detected in the line part from the edge to the other edge of the particle. As seen in FIG. 2, oxygen and iron are detected from the edge to the edge in the analysis range in the linear analysis. In the BF image of FIG. 1, Si is clearly detected even at the sites where interference fringes of the crystal lattice are confirmed, so that it is considered that the particles are in the state in which Si is captured in the iron oxide crystal, namely, that Si is contained in the inside of the particle. According to the line analysis results, there are some sites where silicon is not partially detected in the inside of the particle (the sites in the line analysis of FIG. 2, where the atomic % of Si is 0), and further, some sites where atomic % of silicon is detected higher than that of iron at the surface sites of the particle, which indicates that a part or all of the surface of the particle is coated with silicon. Namely, it can be understood that silicon is contained in the inside of the particle, but silicon mainly exists in the surface layer of the particle. Further, (e) in FIG. 1 is a result of further enlarged and observed bright field image of (a) (observation magnification: 50,000,000 times), and clear distortion of the crystal lattice and defect sites such as the dashed line sites are observed in (e). FIG. 3 shows a mapping result using an STEM photograph of the silicon doped iron oxide particles obtained in the later described Example 1-2. FIG. 4 shows a linear analysis result at the position indicated by the broken line in the dark field image (HAADF image) of FIG. 3. As seen in FIGS. 3 and 4, the particles obtained in Example 1-2 are different from the particles obtained in Example 1-1, and are silicon doped iron oxide particles containing silicon, oxygen and iron in the entire particles. As in Example 1-1, silicon and iron are detected randomly, and Si is clearly detected even at the site where interference fringes of the crystal lattice are confirmed, so that it is considered that the particles are in the state in which Si is captured in the iron oxide crystal, namely, that Si is contained in the inside of the particle. Similarly, the silicon doped iron oxide particles in Example 1-3 and Example 1-4, are silicon doped iron oxide particles in which silicon, iron and oxygen were detected at least in the inside of the particles.

FIG. 5 shows an XRD measurement result of the silicon doped iron oxide particles obtained in Example 1-1 and the iron oxide particles obtained in Comparative Example 1. As seen in FIG. 5, a peak of α-$Fe_2O_3$ was clearly detected in the XRD measurement result of the iron oxide particles obtained in Comparative Example 1, but a broad peak was detected in Example 1-1. The possibility was considered that distortion of the α-$Fe_2O_3$ crystal was generated because Si was captured in the inside of the particle. The similar XRD measurement results as in Example 1-1 were also obtained for the silicon doped iron oxide particles obtained in Example 1-2 to Example 1-4.

Figure 11:
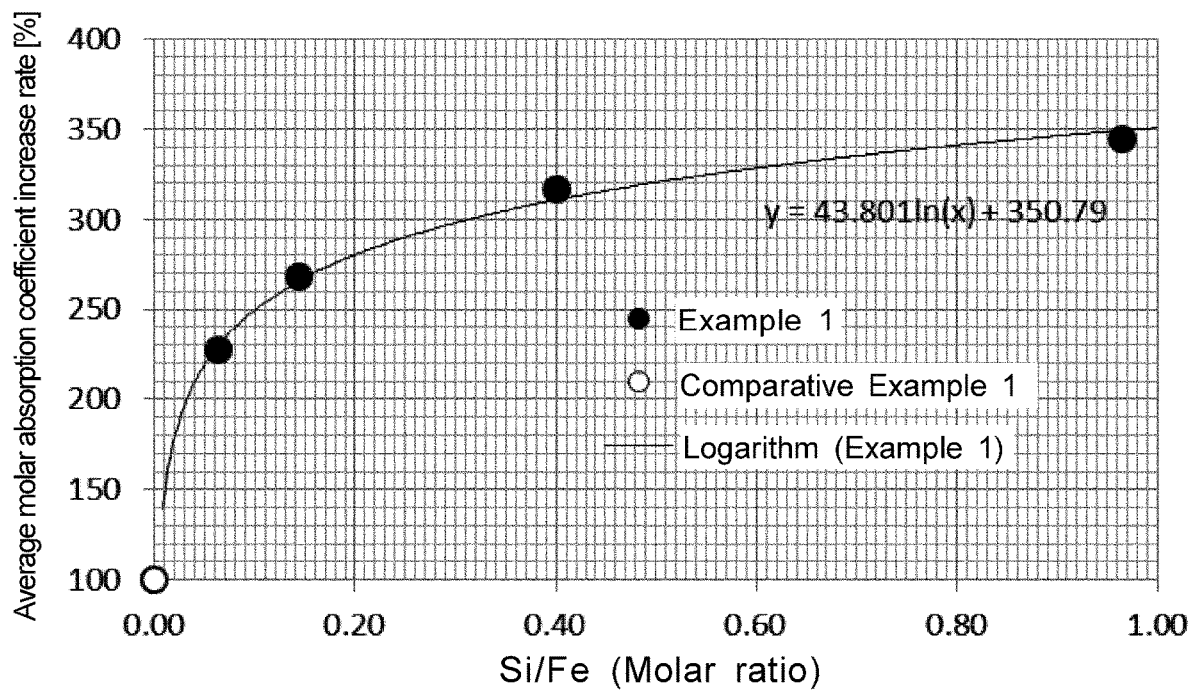
FIG. 11 shows a graph of an average molar absorption coefficient increase rate in the wavelength range of 200 nm to 380 nm with respect to Si/Fe (molar ratio) of the silicon doped iron oxide particles obtained in Example 1 of the present invention.

FIG. 6 shows a graph of a molar absorption coefficient with respect to a measurement wavelength, wherein the molar absorption coefficient was calculated a absorption spectrum of a dispersion in which the silicon doped iron oxide particles obtained in Example 1-1 to Example 1-4 and the iron oxide particles obtained in Comparative Example 1 are dispersed in propylene glycol, and the molar concentration of the silicon doped iron oxide particles (as $Fe_2O_3$+Si) or the iron oxide particles (as $Fe_2O_3$) in the measured dispersion. In addition, Table 3 shows Si/Fe (molar ratio) and an average molar absorption coefficient in the wavelength range of 200 nm to 380 nm of the silicon doped iron oxide particles obtained in Example 1-1 to Example 1-4 together with an average molar absorption coefficient in the wavelength range of 200 nm to 380 nm of the iron oxide particles obtained in Comparative Example 1. Furthermore. Table 3 shows an increase rate of the average molar absorption coefficient (average molar absorption coefficient increase rate) in the wavelength range of 200 nm to 380 nm of the silicon doped iron oxide particles obtained in Example 1-1 to Example 1-4, relative to the average molar absorption coefficient in the same wavelength range of the iron oxide particles of Comparative Example 1 was described. Further, FIG. 11 shows a graph of an average molar absorption coefficient increase rate, with respect to Si/Fe (molar ratio) of the silicon doped iron oxide particles obtained in Example 1-1 to Example 1-4, and an approximation curve calculated by logarithmic approximation, and an equation of an approximation curve.

TABLE 3

| | Example 1-1 | Example 1-2 | Example 1-3 | Example 1-4 | Comparative Example 1 |
|---|---|---|---|---|---|
| Si/Fe [molar ratio] | 0.06 | 0.14 | 0.40 | 0.96 | 0.00 |
| Average molar absorption coefficient | 1735 | 2048 | 2419 | 2633 | 764 |

TABLE 3-continued

|  | Example 1-1 | Example 1-2 | Example 1-3 | Example 1-4 | Comparative Example 1 |
|---|---|---|---|---|---|
| [L/(mol · cm)] (200-380 nm) |  |  |  |  |  |
| Average molar absorption coefficient increase rate [%] | 227 | 268 | 317 | 345 | 100 |

As seen in FIG. 6, FIG. 11 and Table 3, there was a tendency that the average molar absorption coefficient in the wavelength range of 200 nm to 380 nm increased, as Si/Fe (molar ratio) increased. Also, as seen in Table 3, it is found that the average molar absorption coefficients in the wavelength range of 200 nm to 380 nm of the silicon doped iron oxide particles obtained in Example 1-1 to Example 1-4 are very high as compared to iron oxide particles not doped with silicon. It is preferable in the silicon doped iron oxide particles in the present invention, that Si/Fe (molar ratio) contained in the silicon doped iron oxide particles is 0.01 or more and 1.00 or less; and the average molar absorption coefficient increase rate in the wavelength range of 200 nm to 380 nm is 110% or more, and the average molar absorption coefficient is 1,500 L/(mol·cm) or more, for a dispersion obtained by dispersing the silicon doped metal oxide particles in a dispersion medium. When the molar absorbance coefficient is increased to this level, namely, only by adding a very small amount of the silicon doped iron oxide particles, ultraviolet absorption becomes possible. In addition, coated articles or films and glasses having high designability from light skin color to highly colored red can be produced by utilizing red coloration of the above iron oxide.

Example 2

Example 2 describes silicon doped zinc oxide particles containing silicon in at least the inside of zinc oxide particles as the silicon doped metal oxide particles. The silicon doped zinc oxide particles were produced in the same manner as in Example 1 except for the contents described in Table 4 and Table 5. Further, in Comparative Example 2, zinc oxide particles not doped with silicon were produced.

Regarding the substances represented by the chemical formula and abbreviations set forth in Table 4, $Zn(NO_3)_2 \cdot 6H_2O$ is zinc nitrate hexahydrate (Kanto Chemical Co., Ltd.), EG is ethylene glycol (Kishida Chemical Co., Ltd.), 60 wt % $HNO_3$ is concentrated nitric acid (Kishida Chemical Co., Ltd.), NaOH is sodium hydroxide (Kanto Chemical Co., Inc.), and TEOS is tetraethyl orthosilicate (Wako Pure Chemical Industry, Ltd.).

In Table 5, as in Example 1, the operating conditions of the fluid processing apparatus, and the average primary particle diameter calculated from the TEM observation results of the obtained silicon doped zinc oxide particles, and the molar ratio of Si/Zn calculated from the TEM-EDS analysis are shown together with the calculated values calculated from the formulations of liquid A and liquid B and the introduction flow rates. The same method as in Example 1 was used for the pH measurement, analysis, and washing of particles.

TABLE 4

| | | Formulation of the 1st fluid (liquid A) | | | | | | | | |
|---|---|---|---|---|---|---|---|---|---|---|
| | | Formulation | | | | | | | pH | |
| | | Raw material | [wt %] | Raw material | [wt %] | Raw material | [wt %] | Raw material | [wt %] | pH | [° C.] |
| Example 2-1 | Oxide raw material liquid | $Zn(NO_3)_2 \cdot 6H_2O$ | 3.000 | TEOS | 0.128 | 60 wt % $HNO_3$ | 0.003 | EG | 96.869 | 1.86 | 28.8 |
| Example 2-2 | | $Zn(NO_3)_2 \cdot 6H_2O$ | 3.000 | TEOS | 0.178 | 60 wt % $HNO_3$ | 0.003 | EG | 96.819 | 1.89 | 28.9 |
| Example 2-3 | | $Zn(NO_3)_2 \cdot 6H_2O$ | 3.000 | TEOS | 0.367 | 60 wt % $HNO_3$ | 0.003 | EG | 96.630 | 1.99 | 29.1 |
| Example 2-4 | | $Zn(NO_3)_2 \cdot 6H_2O$ | 3.000 | TEOS | 0.478 | 60 wt % $HNO_3$ | 0.003 | EG | 96.519 | 2.06 | 29.1 |
| Comparative Example 2 | | $Zn(NO_3)_2 \cdot 6H_2O$ | 3.000 | — | — | — | — | EG | 97.000 | 2.36 | 29.4 |

| | | Formulation of the 2nd fluid (liquid B) | | | | |
|---|---|---|---|---|---|---|
| | | Formulation | | | | pH |
| | | Raw material | [wt %] | Raw material | [wt %] | pH | [° C.] |
| Example 2-1 | Oxide precipitation solvent | NaOH | 9.00 | Pure water | 91.00 | >14 | — |
| Example 2-2 | | NaOH | 9.00 | Pure water | 91.00 | >14 | — |
| Example 2-3 | | NaOH | 9.00 | Pure water | 91.00 | >14 | — |
| Example 2-4 | | NaOH | 9.00 | Pure water | 91.00 | >14 | — |
| Comparative Example 2 | | NaOH | 9.00 | Pure water | 91.00 | >14 | — |

TABLE 5

|  | Introduction flow rate (liquid sending flow rate) [ml/min] | | Introduction temperature (liquid sending temperature) [° C.] | | Introduction pressure (liquid sending pressure) [MPaG] | | Discharged liquid | | Si/Zn [molar ratio] | | Average primary particle diameter [nm] |
| --- | --- | --- | --- | --- | --- | --- | --- | --- | --- | --- | --- |
|  | Liquid A | Liquid B | Liquid A | Liquid B | Liquid A | Liquid B | pH | Temperature [° C.] | [Calculated value] | [EDS] |  |
| Example 2-1 | 400 | 37 | 201 | 90 | 0.153 | 0.10 | 8.99 | 26.1 | 0.06 | 0.06 | 8.97 |
| Example 2-2 | 400 | 37 | 200 | 90 | 0.149 | 0.10 | 8.97 | 26.1 | 0.08 | 0.08 | 8.88 |
| Example 2-3 | 400 | 37 | 199 | 90 | 0.150 | 0.10 | 8.69 | 25.9 | 0.17 | 0.17 | 8.96 |
| Example 2-4 | 400 | 37 | 200 | 87 | 0.151 | 0.10 | 8.88 | 25.4 | 0.23 | 0.23 | 8.79 |
| Comparative Example 2 | 400 | 38 | 202 | 90 | 0.149 | 0.10 | 9.23 | 27.1 | — | — | 8.79 |

Figure 7:
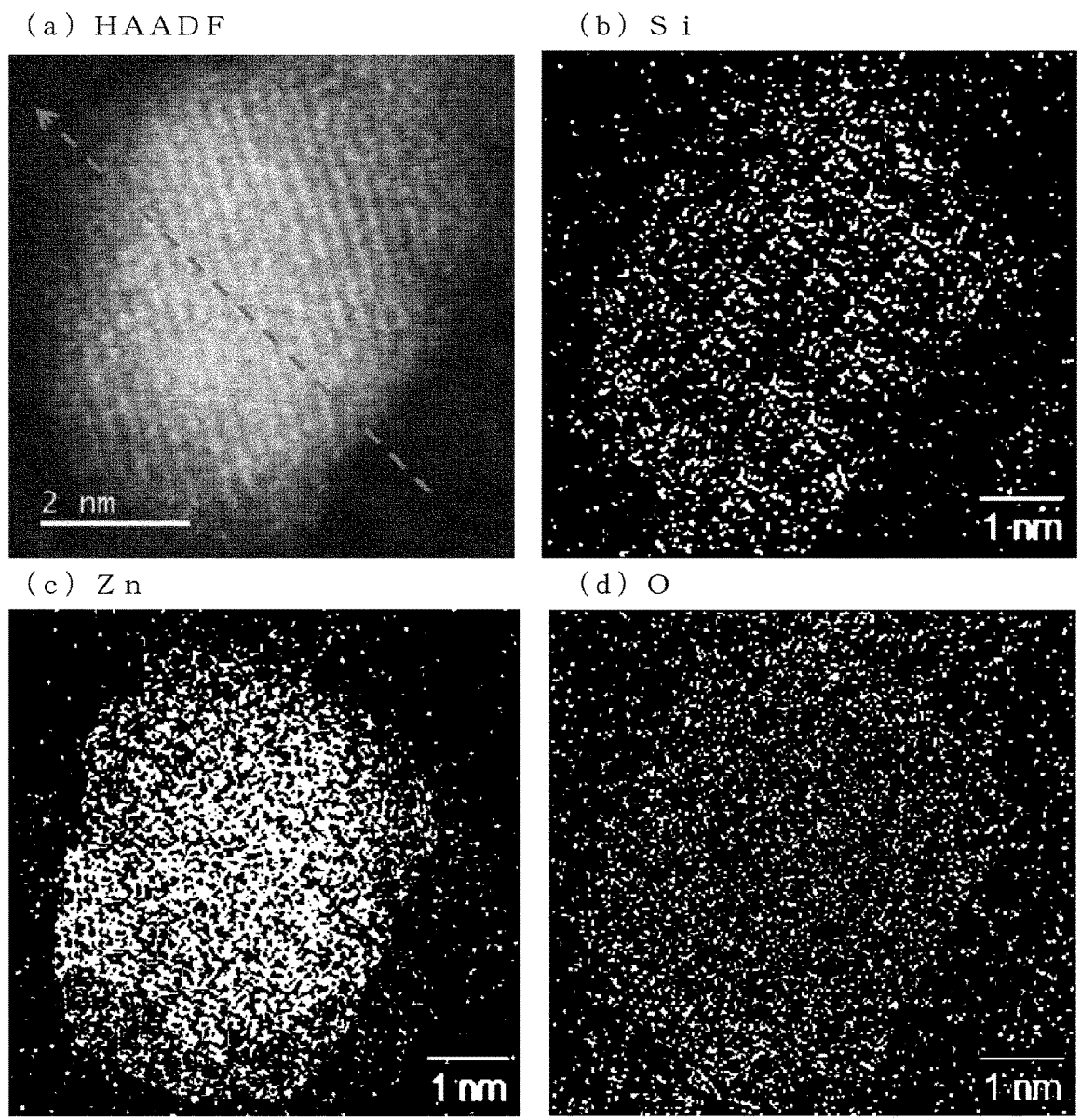
FIG. 7 shows an STEM photograph and a mapping result of the silicon doped zinc oxide particles obtained in Example 2-3 of the present invention.
Figure 8:
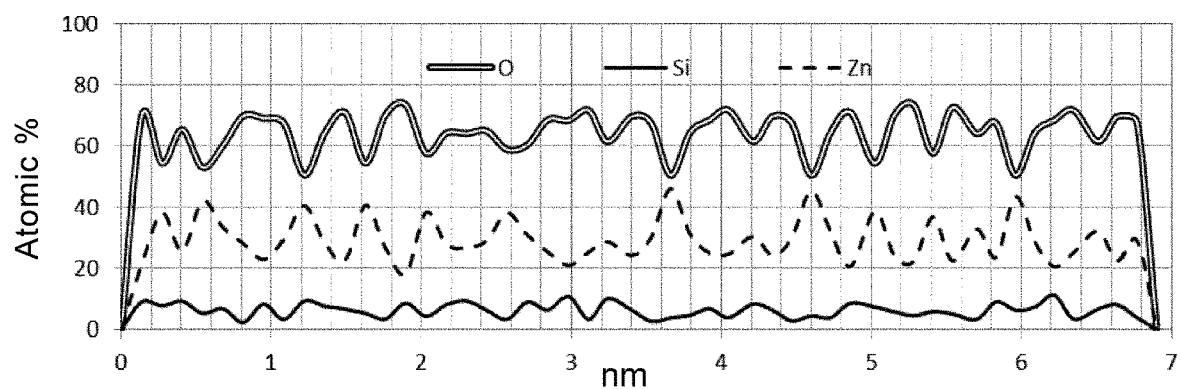
FIG. 8 shows a line analysis result of the silicon doped zinc oxide particles obtained in Example 2-3 of the present invention.

FIG. 7 shows a mapping result using an STEM photograph of the silicon doped zinc oxide particles obtained in Example 2-3. In FIG. 7, (a) shows a mapping result of a dark field image (HAADF image), (b) shows a mapping result of silicon (Si), (c) shows a mapping result of zinc (Zn), and (d) shows a mapping result of oxygen (O). FIG. 8 shows a linear analysis result at the position indicated by the broken line in the HAADF image of FIG. 7. As seen in FIG. 7 and FIG. 8, the particles obtained in Example 2-3 were found to be silicon doped zinc oxide particles containing silicon, oxygen and zinc in the entire particles. Similar results were obtained for the silicon doped zinc oxide particles obtained in Example 2-1, Example 2-2 and Example 2-4.

Figure 9:
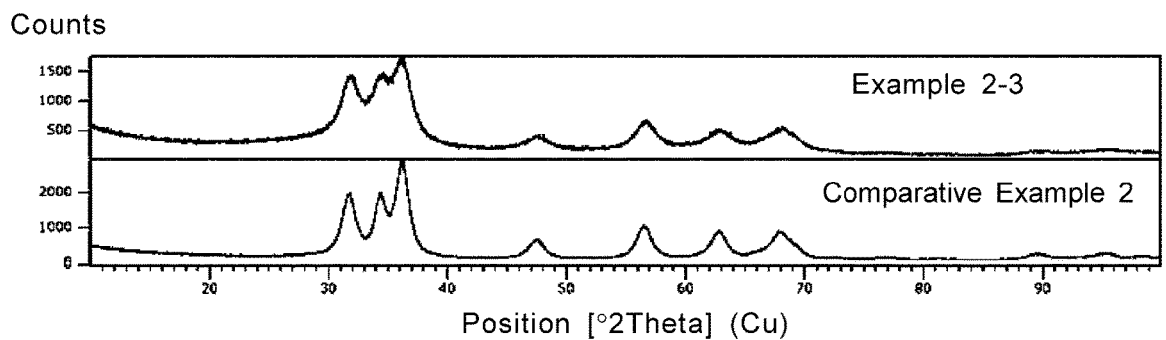
FIG. 9 shows an XRD measurement result of the silicon doped zinc oxide particles obtained in Example 2-3 of the present invention and the zinc oxide particles obtained in Comparative Example 2.

FIG. 9 shows an XRD measurement result of the silicon doped zinc oxide particles obtained in Example 2-3 and the zinc oxide particles obtained in Comparative Example 2. As seen in FIG. 9, a peak of ZnO was clearly detected in the XRD measurement result of the zinc oxide particles obtained in Example 2-3 and Comparative Example 2, but a broad peak was detected in Example 2-3 as compared with Comparative Example 2. The possibility was considered that distortion of ZnO crystal was generated because Si was captured in the inside of the particle. The similar XRD measurement results as in Example 2-3 were also obtained for the silicon doped zinc oxide particles obtained in Example 2-1, Example 2-2 and Example 2-4.

Figure 10:
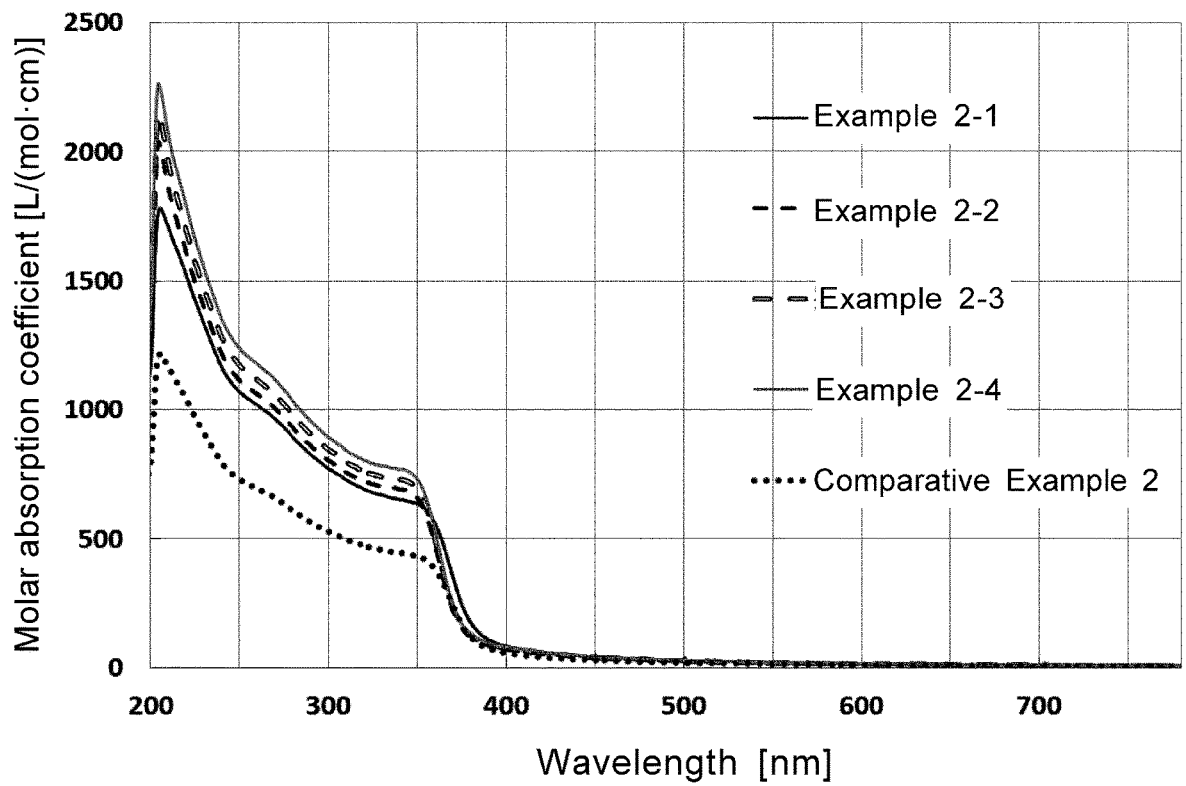
FIG. 10 shows a graph of a molar absorption coefficient of a dispersion in which the silicon doped zinc oxide particles obtained in Example 2-1 to Example 2-4 of the present invention and the zinc oxide particles obtained in Comparative Example 2 are dispersed in propylene glycol.

FIG. 10 shows a graph of a molar absorption coefficient with respect to a measurement wavelength, wherein the molar absorption coefficient was calculated from an absorption spectrum of dispersion in which the silicon doped zinc oxide particles obtained in Example 2-1 to Example 2-4 and the zinc oxide particles obtained in Comparative Example 2 were dispersed in propylene glycol, and the molar concentration of the silicon doped zinc oxide particles (as ZnO+Si) or the zinc oxide particles (as ZnO) in the dispersion. In addition, Table 6 shows Si/Zn (molar ratio) and an average molar absorption coefficient in the wavelength range of 200 nm to 380 nm of the silicon doped zinc oxide particles obtained in Example 2-1 to Example 2-4 together with an average molar absorption coefficient in the wavelength range of 200 nm to 380 nm of the zinc oxide particles obtained in Comparative Example 2. Furthermore, Table 6 shows an increase rate of the average molar absorption coefficient (average molar absorption coefficient increase rate) in the wavelength range of 200 nm to 380 nm of the silicon doped zinc oxide particles obtained in Example 2-1 to Example 2-4, relative to the average molar absorption coefficient in the same wavelength range of the zinc oxide particles of Comparative Example 2 was described. Further, FIG. 12 shows a graph of an average molar absorption coefficient increase rate, with respect to Si/Zn (molar ratio) of the silicon doped zinc oxide particles obtained in Example 2-1 to Example 2-4, and an approximation curve calculated by logarithmic approximation, and an equation of an approximation curve.

TABLE 6

|  | Example 2-1 | Example 2-2 | Example 2-3 | Example 2-4 | Comparative Example 2 |
| --- | --- | --- | --- | --- | --- |
| Si/Zn [molar ratio] | 0.06 | 0.08 | 0.17 | 0.23 | 0.00 |
| Average molar absorption coefficient [L/(mol · cm)] (200-380 nm) | 912 | 946 | 996 | 1051 | 633 |
| Average molar absorption coefficient increase rate [%] | 144 | 149 | 157 | 166 | 100 |

Figure 12:
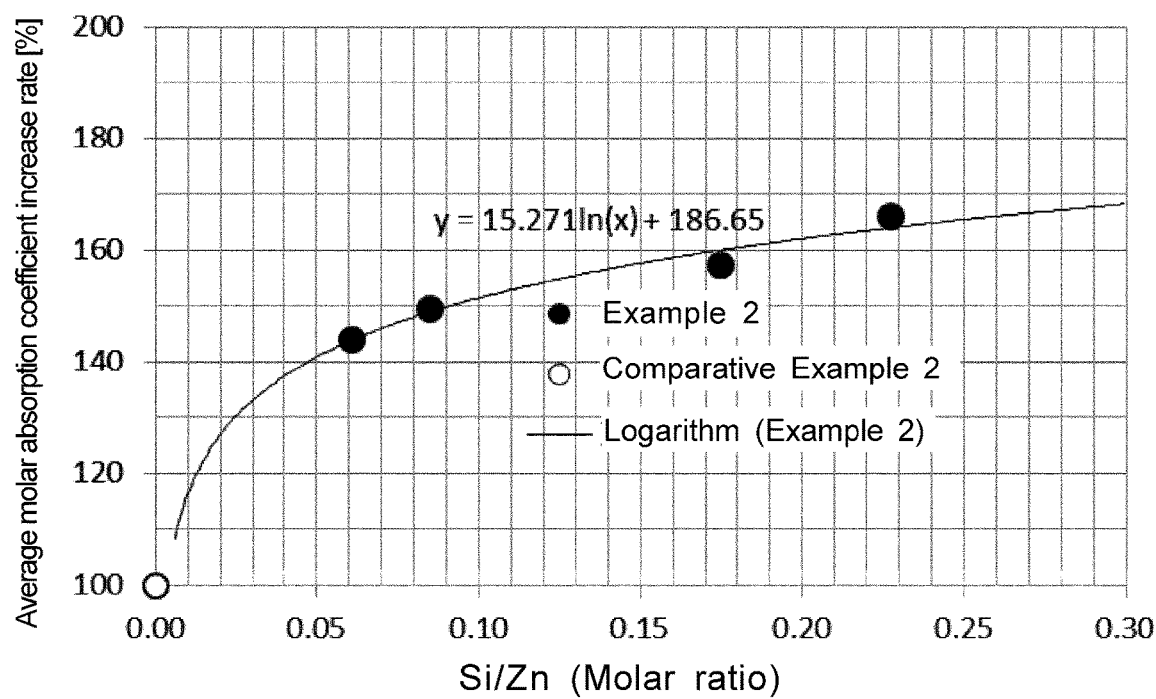
FIG. 12 shows a graph of an average molar absorption coefficient increase rate in the wavelength range of 200 nm to 380 nm with respect to Si/Zn (molar ratio) of the silicon doped zinc oxide particles obtained in Example 2 of the present invention.

As seen in FIG. 10, FIG. 12 and Table 6, there was a tendency that the average molar absorption coefficient in the wavelength range of 200 nm to 380 nm increased, as Si/Zn (molar ratio) increased. Also, as seen in Table 6, it is found that the average molar absorption coefficients in the wavelength range of 200 nm to 380 nm of the silicon doped zinc oxide particles obtained in Example 2-1 to Example 2-4 are very high as compared to zinc oxide particles not doped with silicon. It is preferable in the silicon doped zinc oxide particles in the present invention, that Si/Zn (molar ratio) contained in the silicon doped zinc oxide particles is 0.01 or more and 0.30 or less; and the average molar absorption coefficient increase rate in the wavelength range of 200 nm to 380 nm is 110% or more, and the average molar absorption coefficient is preferably 650 L/(mol·cm) or more, for a dispersion obtained by dispersing the silicon doped zinc oxide particles in a dispersion medium. In addition, a composition suitable for coated articles or films and glasses having ultraviolet absorption ability and high transparency can be provided by using the above silicon doped zinc oxide particles to a composition for coating or a film like composition.

Example 3

Example 3 describes silicon doped cerium oxide particles containing silicon in at least the inside of cerium oxide particles as the silicon doped metal oxide particles. The silicon doped cerium oxide particles were produced in the same manner as in Example 1 except for the contents described in Table 7 and Table 8. Further, in Comparative Example 3, cerium oxide particles not doped with silicon were produced.

Regarding the substances represented by the chemical formula and abbreviations set forth in Table 7, DMAE is dimethylaminoethanol (Kishida Chemical Co., Ltd.), 60 wt % $HNO_3$ is concentrated nitric acid (Kishida Chemical Co., Ltd.), $Ce(NO_3)_3 \cdot 6H_2O$ is cerium (III) nitrate hexahydrate (Wako Pure Chemical Industries, Ltd.), and TEOS is tetraethyl orthosilicate (Wako Pure Chemical Industry, Ltd.).

In Table 8, as in Example 1, the operating conditions of the fluid processing apparatus, and the average primary particle diameter calculated from the TEM observation results of the obtained silicon doped cerium oxide particles, and the molar ratio of Si/Ce calculated from the TEM-EDS analysis are shown together with the calculated values calculated from the formulations of liquid A and liquid B and the introduction flow rates. The same method as in Example 1 was used for the pH measurement, analysis, and washing of particles.

TABLE 7

| | Formulation of the 1st fluid (liquid A) | | | | | | |
|---|---|---|---|---|---|---|---|
| | Formulation | | | | pH | | Formulation of the |
| | Raw material | [wt %] | Raw material | [wt %] | pH | [° C.] | 2nd fluid (liquid B) |
| Example 3-1 | Oxide precipitation solvent DMAE | 1.40 | Pure water | 98.60 | 11.4 | 26.7 | Oxide raw material liquid |
| Example 3-2 | DMAE | 1.40 | Pure water | 98.60 | 11.4 | 26.7 | |
| Example 3-3 | DMAE | 1.40 | Pure water | 98.60 | 11.4 | 26.7 | |
| Example 3-4 | DMAE | 1.40 | Pure water | 98.60 | 11.4 | 26.7 | |
| Comparative Example 3 | DMAE | 1.40 | Pure water | 98.60 | 11.4 | 26.7 | |

| | Formulation of the 2nd fluid (liquid B) | | | | | | | | |
|---|---|---|---|---|---|---|---|---|---|
| | Formulation | | | | | | | pH | |
| | Raw material | [wt %] | Raw material | [wt %] | Raw material | [wt %] | Raw material | [wt %] | pH | [° C.] |
| Example 3-1 | $Ce(NO_3)_3 \cdot 6H_2O$ | 9.000 | TEOS | 0.200 | 60 wt % $HNO_3$ | 0.013 | Pure water | 90.787 | 2.16 | 27.1 |
| Example 3-2 | $Ce(NO_3)_3 \cdot 6H_2O$ | 9.000 | TEOS | 0.500 | 60 wt % $HNO_3$ | 0.013 | Pure water | 90.487 | 1.93 | 27.2 |
| Example 3-3 | $Ce(NO_3)_3 \cdot 6H_2O$ | 9.000 | TEOS | 0.820 | 60 wt % $HNO_3$ | 0.013 | Pure water | 90.167 | 1.84 | 27.3 |
| Example 3-4 | $Ce(NO_3)_3 \cdot 6H_2O$ | 9.000 | TEOS | 1.160 | 60 wt % $HNO_3$ | 0.013 | Pure water | 89.827 | 1.76 | 27.4 |
| Comparative Example 3 | $Ce(NO_3)_3 \cdot 6H_2O$ | 9.000 | — | — | — | — | Pure water | 91.000 | 3.20 | 26.8 |

TABLE 8

| | Introduction flow rate (liquid sending flow rate) [ml/min] | | Introduction temperature (liquid sending temperature) [° C.] | | Introduction pressure (liquid sending pressure) [MPaG] | | Discharged liquid | | Si/Ce [molar ratio] | | Average primary particle diameter [nm] |
|---|---|---|---|---|---|---|---|---|---|---|---|
| | Liquid A | Liquid B | Liquid A | Liquid B | Liquid A | Liquid B | pH | Temperature [° C.] | [Calculated value] | [EDS] | |
| Example 3-1 | 100 | 40 | 136 | 88 | 0.333 | 0.10 | 7.26 | 24.6 | 0.05 | 0.05 | 5.18 |
| Example 3-2 | 100 | 40 | 136 | 86 | 0.312 | 0.10 | 7.36 | 24.1 | 0.12 | 0.12 | 5.23 |
| Example 3-3 | 100 | 40 | 135 | 87 | 0.319 | 0.10 | 7.39 | 24.1 | 0.19 | 0.19 | 5.22 |
| Example 3-4 | 100 | 40 | 137 | 86 | 0.299 | 0.10 | 7.39 | 24.9 | 0.27 | 0.27 | 5.39 |
| Comparative Example 3 | 100 | 40 | 135 | 81 | 0.333 | 0.10 | 7.97 | 29.6 | — | — | 5.19 |

As a result of a mapping and line analysis using an STEM photograph of the silicon doped cerium oxide particles obtained in Example 3-1 to Example 3-4, the obtained particles were found to contain silicon, oxygen and cerium in the entire particles (FIG. not shown). In addition, based on the XRD measurement results of the silicon doped cerium oxide particles obtained in Example 3-1 to Example 3-4 and the XRD measurement result of the cerium oxide particles obtained in Comparative Example 3, a peak of $CeO_2$ was detected in all XRD measurement results, but a broad peak was detected in Example 3-1 to 3-4 as compared with Comparative Example 3. The possibility was considered that distortion of the $CeO_2$ crystal was generated because Si was captured in the inside of the particle (FIG. not shown).

Table 9 shows Si/Ce (molar ratio) of the silicon doped cerium oxide particles obtained in Example 3-1 to Example 3-4, and the average molar absorption coefficient in the wavelength range of 200 nm to 380 nm which is calculated from an absorption spectrum of a dispersion in which the silicon doped cerium oxide particles obtained in Example 3-1 to Example 3-4 and the cerium oxide particles obtained in Comparative Example 3 are dispersed in propylene glycol, and the molar concentration of the silicon doped cerium oxide particles (as $CeO_2$+Si) or the cerium oxide particles (as $CeO_2$) in the measured dispersion. Furthermore, Table 9 shows the increase rate of the average molar absorption coefficient (average molar absorption coefficient increase rate) in the wavelength range of 200 nm to 380 nm of the silicon doped cerium oxide particles obtained in Example 3-1 to Example 3-4, relative to the average molar absorption coefficient in the same wavelength range of the cerium oxide particles of Comparative Example 3 was described. Further, FIG. 13 shows a graph of an average molar absorption coefficient increase rate, with respect to Si/Ce (molar ratio) of the silicon doped cerium oxide particles obtained in Example 3-1 to Example 3-4, and an approximation curve calculated by logarithmic approximation, and an equation of an approximation curve.

TABLE 9

|  | Example 3-1 | Example 3-2 | Example 3-3 | Example 3-4 | Comparative Example 3 |
|---|---|---|---|---|---|
| Si/Ce [molar ratio] | 0.05 | 0.12 | 0.19 | 0.27 | 0.00 |
| Average molar absorption coefficient [L/(mol · cm)] (200-380 nm) | 4196 | 4268 | 4315 | 4356 | 3655 |
| Average molar absorption coefficient increase rate [%] | 115 | 117 | 118 | 119 | 100 |

Figure 13:
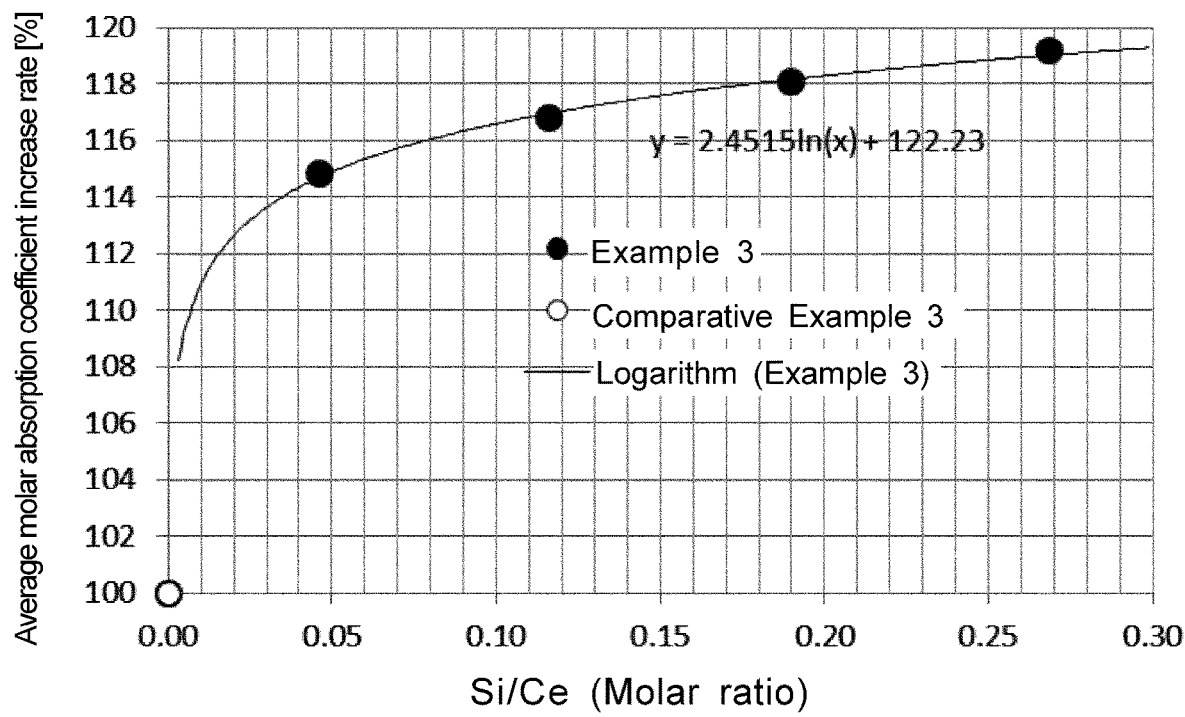
FIG. 13 shows a graph of an average molar absorption coefficient increase rate in the wavelength range of 200 nm to 380 nm with respect to Si/Ce (molar ratio) of the silicon doped cerium oxide particles obtained in Example 3 of the present invention.

As seen in FIG. 13 and Table 9, there was a tendency that the average molar absorption coefficient in the wavelength range of 200 nm to 380 nm increased, as Si/Ce (molar ratio) increased. Also, as seen in Table 9, it is found that the average molar absorption coefficients in the wavelength range of 200 nm to 380 nm of the silicon doped cerium oxide particles obtained in Example 3-1 to Example 3-4 are very high as compared to cerium oxide particles not doped with silicon. It is preferable in the silicon doped cerium oxide particles in the present invention, that Si/Ce (molar ratio) contained in the silicon doped cerium oxide particles is 0.01 or more and 0.30 or less; and the average molar absorption coefficient increase rate in the wavelength range of 200 nm to 380 nm is 110% or more, and the average molar absorption coefficient is preferably 4,000 L/(mol·cm) or more, for a dispersion obtained by dispersing the silicon doped cerium oxide particles in a dispersion medium. In addition, a composition suitable for coated articles or films and glasses having ultraviolet absorption ability and high transparency can be provided by using the above silicon doped cerium oxide particles to a composition for coating or a film like composition.

Example 4

Example 4 describes silicon doped metal oxide particles containing silicon and a metal element included in the oxide raw material liquid described in Table 10 (silicon doped magnesium iron complex oxide and silicon doped manganese iron complex oxide) as the silicon doped metal oxide particles. The silicon doped metal oxide particles were produced in the same manner as in Example 1 except for the contents described in Table 10 and Table 11.

Regarding the substances represented by the chemical formula and abbreviations set forth in Table 10, in addition to the substances used in Example 1 to Example 3, $Mg(NO_3)_2 \cdot 6H_2O$ is magnesium (II) hexahydrate (Wako Pure Chemical Industries, Ltd.), and $Mn(NO_3)_2 \cdot 6H_2O$ is manganese (II) hexahydrate (Wako Pure Chemical Industries, Ltd.).

TABLE 10

| | | Formulation of the 1st fluid (liquid A) | | | | | | | |
|---|---|---|---|---|---|---|---|---|---|
| | | Formulation | | | | | | | |
| | | Raw material | [wt %] | Raw material | [wt %] | Raw material | [wt %] | Raw material | [wt %] |
| Example 4-1 | Oxide raw material liquid | $Fe(NO_3)_3 \cdot 9H_2O$ | 2.000 | $Mg(NO_3)_2 \cdot 6H_2O$ | 0.019 | TEOS | 0.066 | 60 wt % $HNO_3$ | 0.660 |
| Example 4-2 | | $Fe(NO_3)_3 \cdot 9H_2O$ | 2.000 | $Mg(NO_3)_2 \cdot 6H_2O$ | 0.019 | TEOS | 0.149 | 60 wt % $HNO_3$ | 0.660 |
| Example 4-3 | | $Fe(NO_3)_3 \cdot 9H_2O$ | 2.000 | $Mg(NO_3)_2 \cdot 6H_2O$ | 0.039 | TEOS | 0.994 | 60 wt % $HNO_3$ | 0.660 |
| Example 4-4 | | $Fe(NO_3)_3 \cdot 9H_2O$ | 2.000 | $Mn(NO_3)_2 \cdot 6H_2O$ | 0.022 | TEOS | 0.066 | 60 wt % $HNO_3$ | 0.660 |
| Example 4-5 | | $Fe(NO_3)_3 \cdot 9H_2O$ | 2.000 | $Mn(NO_3)_2 \cdot 6H_2O$ | 0.044 | TEOS | 0.149 | 60 wt % $HNO_3$ | 0.660 |
| Example 4-6 | | $Fe(NO_3)_3 \cdot 9H_2O$ | 2.000 | $Mn(NO_3)_2 \cdot 6H_2O$ | 0.044 | TEOS | 0.994 | 60 wt % $HNO_3$ | 0.660 |

TABLE 10-continued

| | | | | | | | | | |
|---|---|---|---|---|---|---|---|---|---|
| Comparative Example 4-1 | Fe(NO$_3$)$_3$•9H$_2$O | 2.000 | Mg(NO$_3$)$_2$•6H$_2$O | 0.019 | — | — | — | — | |
| Comparative Example 4-2 | Fe(NO$_3$)$_3$•9H$_2$O | 2.000 | Mn(NO$_3$)$_2$•6H$_2$O | 0.022 | — | — | — | — | |

| | Formulation of the 1st fluid (liquid A) | | | | Formulation of the 2nd fluid (liquid B) | | | | | |
|---|---|---|---|---|---|---|---|---|---|---|
| | Formulation | | pH | | | Formulation | | | pH | |
| | Raw material | [wt %] | pH | [° C.] | | Raw material | [wt %] | Raw material | [wt %] | pH | [° C.] |
| Example 4-1 | Pure water | 97.255 | 1.12 | 25.9 | Oxide precipitation solvent | NaOH | 9.00 | Pure water | 91.00 | >14 | — |
| Example 4-2 | Pure water | 97.172 | 1.13 | 26.1 | | NaOH | 9.00 | Pure water | 91.00 | >14 | — |
| Example 4-3 | Pure water | 96.307 | 1.13 | 26.1 | | NaOH | 9.00 | Pure water | 91.00 | >14 | — |
| Example 4-4 | Pure water | 97.252 | 1.76 | 26.2 | | NaOH | 9.00 | Pure water | 91.00 | >14 | — |
| Example 4-5 | Pure water | 97.147 | 1.77 | 26.3 | | NaOH | 9.00 | Pure water | 91.00 | >14 | — |
| Example 4-6 | Pure water | 96.302 | 1.77 | 26.3 | | NaOH | 9.00 | Pure water | 91.00 | >14 | — |
| Comparative Example 4-1 | Pure water | 97.981 | 1.94 | 26.4 | | NaOH | 9.00 | Pure water | 91.00 | >14 | — |
| Comparative Example 4-2 | Pure water | 97.978 | 1.86 | 27.3 | | NaOH | 9.00 | Pure water | 91.00 | >14 | — |

TABLE 11

| | Introduction flow rate (liquid sending flow rate) [ml/min] | | Introduction temperature (liquid sending temperature) [° C.] | | Introduction pressure (liquid sending pressure) [MPaG] | | Discharged liquid | | Si/(Fe + Mg) [molar ratio] | | Average primary particle diameter [nm] |
|---|---|---|---|---|---|---|---|---|---|---|---|
| | Liquid A | Liquid B | Liquid A | Liquid B | Liquid A | Liquid B | pH | Temperature [° C.] | [Calculated value] | [EDS] | |
| Example 4-1 | 400 | 40 | 140 | 85 | 0.388 | 0.10 | 11.97 | 20.9 | 0.06 | 0.06 | 10.63 |
| Example 4-2 | 400 | 40 | 140 | 85 | 0.388 | 0.10 | 11.97 | 20.9 | 0.14 | 0.14 | 10.59 |
| Example 4-3 | 400 | 40 | 140 | 86 | 0.392 | 0.10 | 11.94 | 20.6 | 0.95 | 0.95 | 10.67 |
| Comparative Example 4-1 | 400 | 40 | 142 | 86 | 0.436 | 0.10 | 11.59 | 22.1 | — | — | 10.66 |

| | Introduction flow rate (liquid sending flow rate) [ml/min] | | Introduction temperature (liquid sending temperature) [° C.] | | Introduction pressure (liquid sending pressure) [MPaG] | | Discharged liquid | | Si/(Fe + Mn) [molar ratio] | | Average primary particle diameter [nm] |
|---|---|---|---|---|---|---|---|---|---|---|---|
| | Liquid A | Liquid B | Liquid A | Liquid B | Liquid A | Liquid B | pH | Temperature [° C.] | [Calculated value] | [EDS] | |
| Example 4-4 | 400 | 40 | 141 | 87 | 0.382 | 0.10 | 12.62 | 20.4 | 0.06 | 0.06 | 11.31 |
| Example 4-5 | 400 | 40 | 141 | 87 | 0.382 | 0.10 | 12.62 | 20.4 | 0.14 | 0.14 | 11.29 |
| Example 4-6 | 400 | 40 | 141 | 84 | 0.379 | 0.10 | 12.63 | 20.3 | 0.95 | 0.95 | 11.23 |
| Comparative Example 4-2 | 400 | 40 | 141 | 88 | 0.394 | 0.10 | 12.36 | 20.1 | — | — | 11.25 |

As a result of a mapping and line analysis using an STEM photograph of the silicon doped metal oxide particles obtained in Example 4-1 to Example 4-3, the obtained particles were found to contain silicon, oxygen and a metal element (Fe and Mg) contained in the oxide raw material liquid in the entire particles. As a result of a mapping and line analysis using an STEM photograph of the silicon doped metal oxide particles obtained in Example 4-4 to Example 4-6, the obtained particles were found to contain silicon, oxygen and a metal element (Fe and Mn) contained in the oxide raw material liquid in the entire particles. It was understood that Si and Mg or Mn were captured in the inside of the particles (FIG. not shown). In addition, based on the XRD measurement results of the silicon doped metal oxide particles obtained in Example 4-1 to Example 4-6 and the XRD measurement result of the oxide particles obtained in Comparative Example 4-1 and Comparative Example 4-2, a peak of α-Fe$_2$O$_3$ was detected in all XRD measurement results, but a broad peak was detected in Example 4-1 to 4-6 as compared with Comparative Example 4-1 and Comparative Example 4-2. The possibility was considered that distortion of the α-Fe$_2$O$_3$ crystal was generated because Si was captured in the inside of the particle (FIG. not shown).

Figure 14:
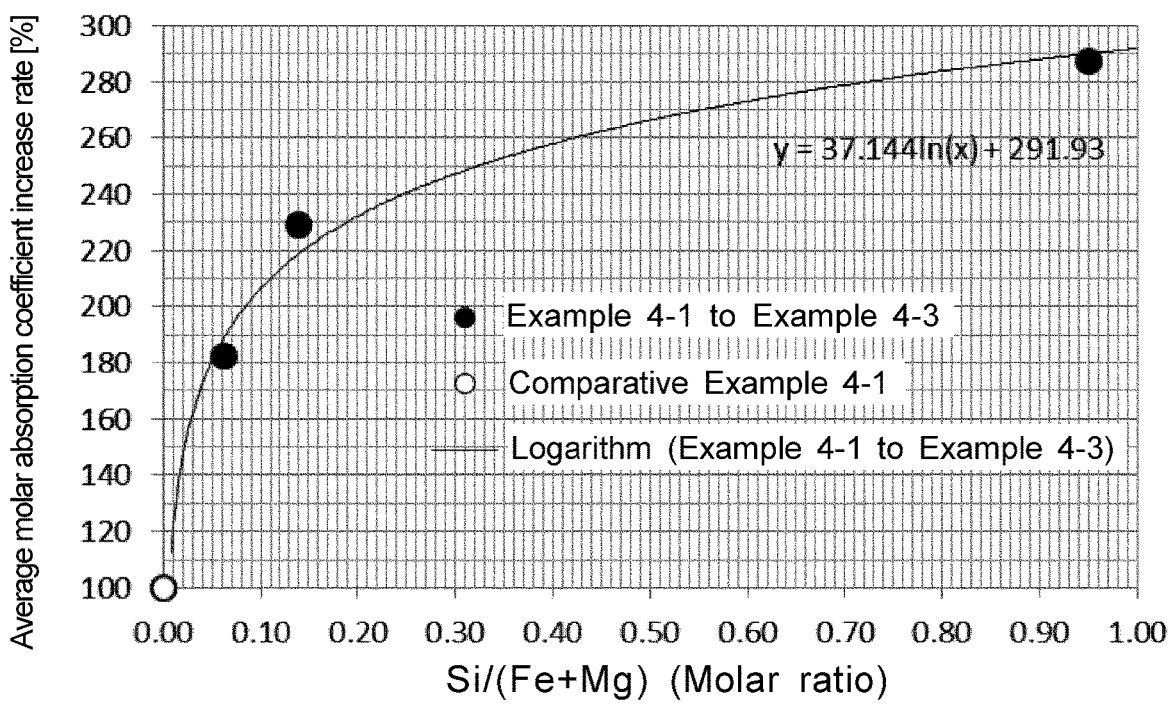
FIG. 14 shows a graph of an average molar absorption coefficient increase rate in the wavelength range of 200 nm to 380 nm with respect to Si/(Fe+Mg) (molar ratio) of the silicon doped oxide particles obtained in Example 4-1 to Example 4-3 of the present invention.
Figure 15:
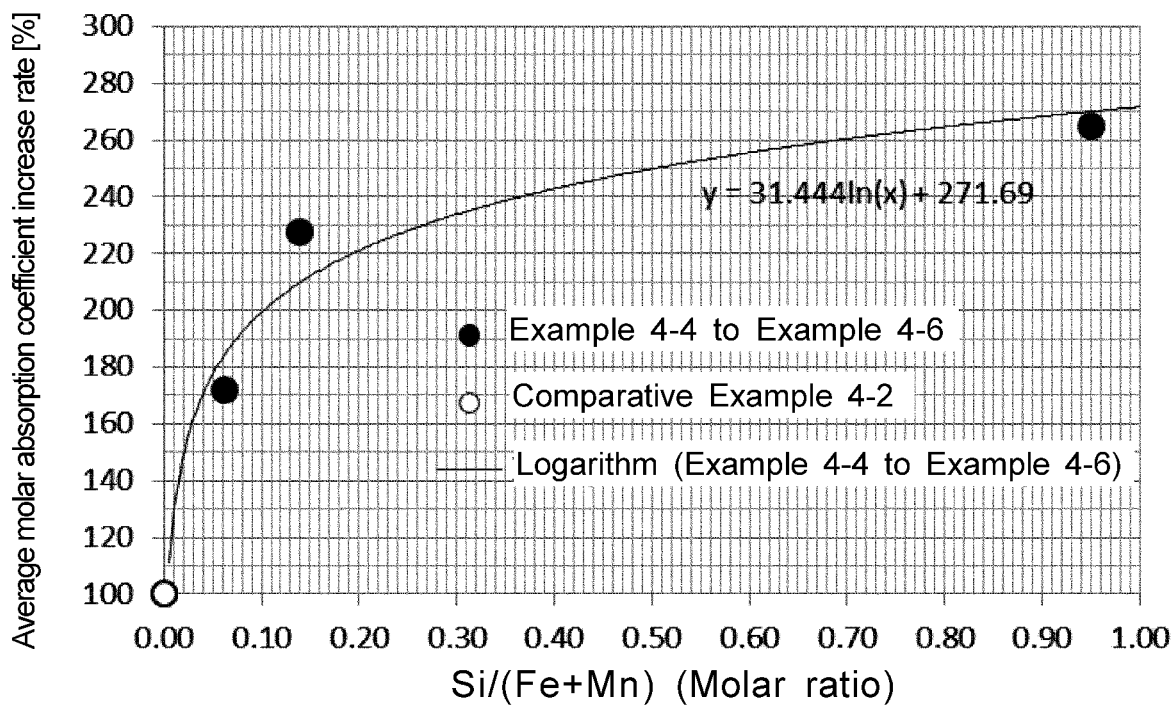
FIG. 15 shows a graph of an average molar absorption coefficient increase rate in the wavelength range of 200 nm to 380 nm with respect to Si/(Fe+Mn) (molar ratio) of the silicon doped oxide particles obtained in Example 4-4 to Example 4-6 of the present invention.

Table 12 shows Si/(Fe+Mg) (molar ratio) and Si/(Fe+Mn) (molar ratio) of the silicon doped metal oxide particles obtained in Example 4-1 to Example 4-6, and the molar absorption coefficient which is calculated from an absorption spectrum of a dispersion in which the silicon doped metal oxide particles obtained in Example 4-1 to Example 4-6 and the oxide particles obtained in Comparative Example 4-1 and Comparative Example 4-2 are dispersed in propylene glycol, and the molar concentration of the oxide particles (as Fe$_2$O$_3$+Mg+Si, or Fe$_2$O$_3$+Mn+Si, and Fe$_2$O$_3$+Mg, or Fe$_2$O$_3$+Mn) in the measured dispersion. Furthermore, Table 12 shows an increase rate of the average molar absorption coefficient (average molar absorption coefficient increase rate) in the wavelength range of 200 nm to 380 nm of the silicon doped oxide particles obtained in Example 4-1 to Example 4-6, relative to the average molar absorption coefficient in the same wavelength range of the oxide particles of Comparative Example 4-1 and Comparative Example 4-2 was described. Further, FIG. 14 shows a graph of an average molar absorption coefficient increase rate, with respect to Si/(Fe+Mg) (molar ratio) of the silicon doped oxide particles obtained in Example 4-1 to Example 4-3, and an approximation curve calculated by logarithmic approximation, and an equation of an approximation curve. FIG. 15 shows a graph of an average molar absorption coefficient increase rate, with respect to Si/(Fe+Mn) (molar ratio) of the silicon doped oxide particles obtained in Example 4-4 to Example 4-6, and an approximation curve calculated by logarithmic approximation, and an equation of an approximation curve.

L/(mol·cm) or more for silicon doped magnesium iron complex oxide particles and silicon doped manganese iron complex oxide particles.

Example 5

In Example 5, the silicon doped iron oxide particles were prepared in the same manner as in Example 1 except for using an apparatus described in JP 2009-112892, and using a method of mixing and reacting liquid A (oxide raw material liquid) and liquid B (oxide precipitation solvent). Here, the apparatus of JP 2009-112892 was an apparatus described in FIG. 1 of JP 2009-112892, and the inner diameter of the stirring tank was 80 mm, and the gap between the outer end of the mixing tool and the inner peripheral surface of the stirring tank was 0.5 mm, and the rotor rotational speed of the stirring blade was 7,200 rpm. Further, liquid A was introduced into the stirring tank, and liquid B was added, mixed and reacted in the thin film consisting of liquid A that was crimped to the inner peripheral surface of the stirring tank. As a result of TEM observation, silicon doped iron oxide particles obtained having a primary particle diameter of about 20 nm to 30 nm were observed. Further, iron oxide particles not doped with silicon having the similar particle diameter were produced in the same manner as in Comparative Example 1 (Comparative Example 5).

As a result of a mapping and line analysis using an STEM photograph of the silicon doped iron oxide particles obtained in Example 5-1 to Example 5-4, the obtained particles were found to be silicon doped iron oxide particles containing silicon, oxygen and iron in the entire particles. In addition,

TABLE 12

| | Example 4-1 | Example 4-2 | Example 4-3 | Comparative Example 4-1 | | Example 4-4 | Example 4-5 | Example 4-6 | Comparative Example 4-2 |
|---|---|---|---|---|---|---|---|---|---|
| Si/(Fe + Mg) [molar ratio] | 0.06 | 0.14 | 0.95 | 0.00 | Si/(Fe + Mn) [molar ratio] | 0.06 | 0.14 | 0.95 | 0.00 |
| Average molar absorption coefficient [L/(mol · cm)] (200-380 nm) | 1695 | 2133 | 2672 | 931 | Average molar absorption coefficient [L/(mol · cm)] (200-380 nm) | 1586 | 2097 | 2439 | 921 |
| Average molar absorption coefficient increase rate [%] | 182 | 229 | 287 | 100 | Average molar absorption coefficient increase rate [%] | 172 | 228 | 265 | 100 |

As seen in FIG. 14, FIG. 15 and Table 12, there was a tendency that the average molar absorption coefficient in the wavelength range of 200 nm to 380 nm increased, as Si/(Fe+Mg) (molar ratio) and Si/(Fe+Mn) (molar ratio) increased. Also, as seen in Table 12, it is found that the average molar absorption coefficients in the wavelength range of 200 nm to 380 nm of the silicon doped metal oxide particles obtained in Example 4-1 to Example 4-6 are very high as compared to the oxide particles not doped with silicon (Comparative Example 4-1 or Comparative Example 4-2). It is preferable in the silicon doped metal oxide particles in the present invention, that Si/(Fe+Mg) (molar ratio) or Si/(Fe+Mn) (molar ratio) contained in the silicon doped metal oxide particles is 0.01 or more and 1.00 or less; and the average molar absorption coefficient increase rate in the wavelength range of 200 nm to 380 nm is 110% or more for a dispersion obtained by dispersing the silicon doped metal oxide particles in a dispersion medium; and the average molar absorption coefficient is preferably 1,500 based on the XRD measurement results of the silicon doped iron oxide particles obtained in Example 5-1 to Example 5-4 and the XRD measurement result of the iron oxide particles obtained in Comparative Example 5, a peak of α-Fe$_2$O$_3$ was detected in all XRD measurement results, but a broad peak was detected in Example 5-1 to Example 5-4 as compared with Comparative Example 5. The possibility was considered that distortion of the α-Fe$_2$O$_3$ crystal was generated because Si was captured in the inside of the particle (FIG. not shown).

Table 13 shows Si/Fe (molar ratio) and the average molar absorption coefficient in the wavelength range of 200 nm to 380 nm of the silicon doped iron oxide particles obtained in Example 5-1 to Example 5-4, and the average molar absorption coefficient in the wavelength range of 200 nm to 380 nm of the iron oxide particles obtained in Comparative Example 5. Furthermore, Table 13 shows an increase rate of the average molar absorption coefficient (average molar absorption coefficient increase rate) in the wavelength range of 200 nm to 380 nm of the silicon doped iron oxide particles obtained in Example 5-1 to Example 5-4, relative to the average molar absorption coefficient in the same wavelength range of the oxide particles of Comparative Example 5 was described. Further, FIG. 16 shows a graph of an average molar absorption coefficient increase rate, with respect to Si/Fe (molar ratio) of the silicon doped iron oxide particles obtained in Example 5-1 to Example 5-4, and an approximation curve calculated by logarithmic approximation, and an equation of an approximation curve.

TABLE 13

|  | Example 5-1 | Example 5-2 | Example 5-3 | Example 5-4 | Comparative Example 5 |
|---|---|---|---|---|---|
| Si/Fe [molar ratio] | 0.06 | 0.14 | 0.40 | 0.96 | 0.00 |
| Average molar absorption coefficient [L/(mol · cm)] (200-380 nm) | 1512 | 1879 | 1931 | 2001 | 687 |
| Average molar absorption coefficient increase rate [%] | 220 | 274 | 281 | 291 | 100 |

Figure 16:
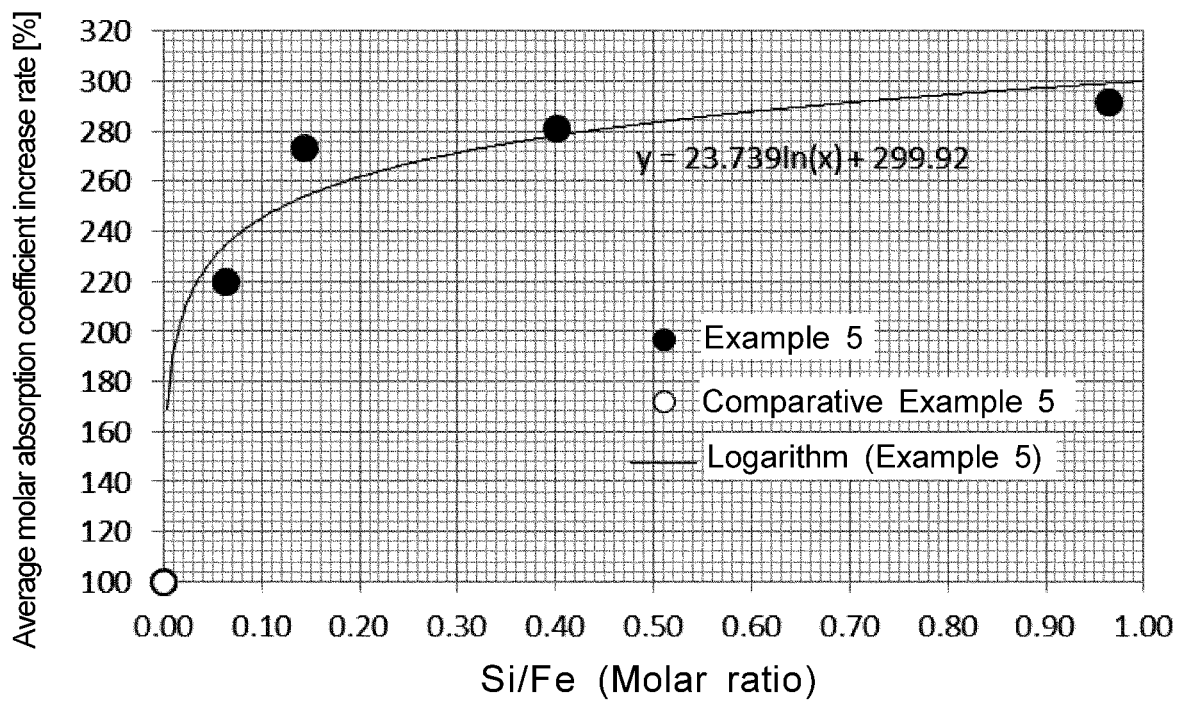
FIG. 16 shows a graph of an average molar absorption coefficient increase rate in the wavelength range of 200 nm to 380 nm with respect to Si/Fe (molar ratio) of the silicon doped oxide particles obtained in Example 5 of the present invention.

As seen in FIG. 16 and Table 13, the similar results as in Example 1 could be obtained even when silicon doped metal oxide particles were produced using an apparatus different from that of Example 1 and different from the apparatus described in Patent Literatures 6 or 7.

The invention claimed is:

1. A composition for ultraviolet absorption, comprising silicon doped metal oxide particles in which metal oxide particles are doped with silicon,
    wherein the silicon doped metal oxide particles are solid solution oxide particles,
    an average primary particle diameter of the silicon doped metal oxide particles is 1 nm or more and less than 10 nm,
    in case that the silicon doped metal oxide particles are constituted by an aggregate of a plurality of the silicon doped metal oxide particles, a size of the aggregate is 50 nm or less,
    a molar ratio (Si/M) of a metal element (M) and silicon (Si) of the silicon doped metal oxide particles is in the range of 0.06 or more and 1.00 or less,
    the metal oxide is not cerium oxide, and
    an average molar absorption coefficient in the wavelength range of 200 nm to 380 nm, of a dispersion in which the silicon doped metal oxide particles are dispersed in a dispersion medium, is improved as compared with the metal oxide particles not doped with silicon,
    wherein:
    (i) at least one of the metal elements (M) is iron (Fe), and an average molar absorption coefficient in the wavelength range of 200 nm to 380 nm, of a dispersion in which the silicon doped metal oxide particles are dispersed in a dispersion medium, is 1,500 L/(mol·cm) or more; or
    (ii) at least one of the metal elements (M) is zinc (Zn), and an average molar absorption coefficient in the wavelength range of 200 nm to 380 nm, of a dispersion in which the silicon doped metal oxide particles are dispersed in a dispersion medium, is 650 L/(mol·cm) or more.

2. The composition for ultraviolet absorption according to claim 1, in which a molar ratio (Si/M) of a metal element (M) and silicon (Si) of the silicon doped metal oxide particles is controlled,
    wherein an increase rate of an average molar absorption coefficient in the wavelength range of 200 nm to 380 nm of a dispersion in which the silicon doped metal oxide particles are dispersed in a dispersion medium, relative to an average molar absorption coefficient in the wavelength range of 200 nm to 380 nm of the metal oxide particles not doped with silicon, is controlled.

3. The composition for ultraviolet absorption according to claim 1, wherein an increase rate of an average molar absorption coefficient in the wavelength range of 200 nm to 380 nm of a dispersion in which the silicon doped metal oxide particles are dispersed in a dispersion medium, relative to an average molar absorption coefficient in the wavelength range of 200 nm to 380 nm of the metal oxide particles not doped with silicon, is 110% or more.

4. A composition for ultraviolet absorption, comprising silicon doped metal oxide particles in which metal oxide particles are doped with silicon,
    wherein a molar ratio (Si/M) of a metal element (M) and silicon (Si) of the silicon doped metal oxide particles is in the range of 0.12 or more and 1.00 or less,
    the silicon doped metal oxide particles are solid solution oxide particles,
    the metal oxide is not cerium oxide, and
    an average molar absorption coefficient in the wavelength range of 200 nm to 380 nm, of a dispersion in which the silicon doped metal oxide particles are dispersed in a dispersion medium, is improved as compared with the metal oxide particles not doped with silicon,
    wherein:
    (i) at least one of the metal elements (M) is iron (Fe), and an average molar absorption coefficient in the wavelength range of 200 nm to 380 nm, of a dispersion in which the silicon doped metal oxide particles are dispersed in a dispersion medium, is 1,500 L/(mol·cm) or more; or
    (ii) at least one of the metal elements (M) is zinc (Zn), and an average molar absorption coefficient in the wavelength range of 200 nm to 380 nm, of a dispersion in which the silicon doped metal oxide particles are dispersed in a dispersion medium, is 650 L/(mol·cm) or more.

5. The composition for ultraviolet absorption according to claim 4, wherein an average primary particle diameter of the silicon doped metal oxide particles is 1 nm or more and 100 nm or less.

* * * * *